United States Patent [19]

Schmidt et al.

[11] Patent Number: 4,528,728
[45] Date of Patent: Jul. 16, 1985

[54] LOCKING SNAP HOOK

[75] Inventors: Terrance L. Schmidt, Littleton; Wayne L. Olson, Evergreen, both of Colo.

[73] Assignee: Rose Manufacturing Company, Englewood, Colo.

[21] Appl. No.: 527,297

[22] Filed: Aug. 26, 1983

Related U.S. Application Data

[63] Continuation-in-part of Ser. No. 433,873, Oct. 13, 1982.

[51] Int. Cl.³ .............................................. A44B 13/02
[52] U.S. Cl. ..................... 24/241 P; 24/231; 24/241 PS; 24/241 S; 24/241 SB; 294/82.2
[58] Field of Search ............ 24/231 R, 241 R, 241 S, 24/241 SB, 241 P, 241 PP, 241 PS; 294/82 R

[56] References Cited

U.S. PATENT DOCUMENTS

| | | | |
|---|---|---|---|
| 527,286 | 10/1894 | Perkins et al. | 24/241 P |
| 815,723 | 3/1906 | Mahoney | 24/241 P |
| 878,060 | 2/1908 | Hammond | 24/241 PS |
| 1,682,617 | 8/1928 | Jensen et al. | 24/241 PP |
| 1,879,167 | 9/1932 | Freysinger | 24/241 P |
| 1,879,168 | 9/1932 | Freysinger | 24/241 SB |
| 2,216,499 | 10/1940 | Ohotto | 24/241 SL |
| 2,706,318 | 4/1955 | Coffing | 24/241 SB |
| 3,317,972 | 5/1967 | Harley | 24/241 P |
| 3,831,994 | 8/1974 | Martin | 24/241 PS |
| 4,062,092 | 12/1977 | Tamada et al. | 24/241 SB |
| 4,122,585 | 10/1978 | Sharp et al. | 24/241 PP |
| 4,320,561 | 3/1982 | Muller et al. | 24/241 PS |

FOREIGN PATENT DOCUMENTS

| | | | |
|---|---|---|---|
| 1044762 | 10/1966 | United Kingdom | 24/241 SB |
| 1065231 | 4/1967 | United Kingdom | 24/241 PS |
| 1203520 | 8/1970 | United Kingdom | 24/241 PS |

Primary Examiner—Victor N. Sakran
Attorney, Agent, or Firm—Jerry W. Berkstresser; Bruce G. Klaas

[57] ABSTRACT

A latching and locking snap hook utilizing a conventionally shaped snap hook body having a normally open hook end portion which is opened and closed to receive and discharge a connector, line or other fixture by movement of a spring biased latch member pivotally connected to the snap hook body at a position remote from the open hook portion, the spring biased latch member extending beyond the body of the snap hook on the side opposite to the open hook end and capable of being moved in a direction away from the hook end portion about the pivot to open the snap hook end portion when a locking member received between the snap hook body and the spring biased latch is moved from a position where it interferes with the movement of the latch to a position where it does not interfere with that movement.

17 Claims, 47 Drawing Figures

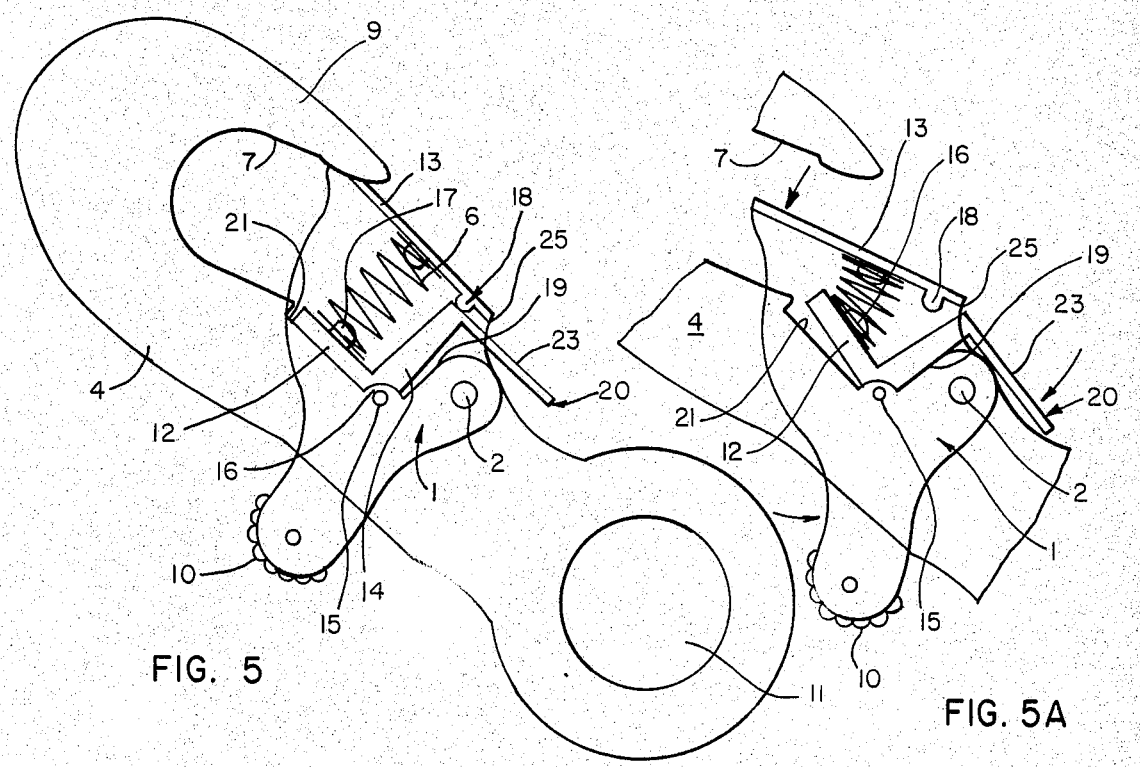
FIG. 5
FIG. 5A
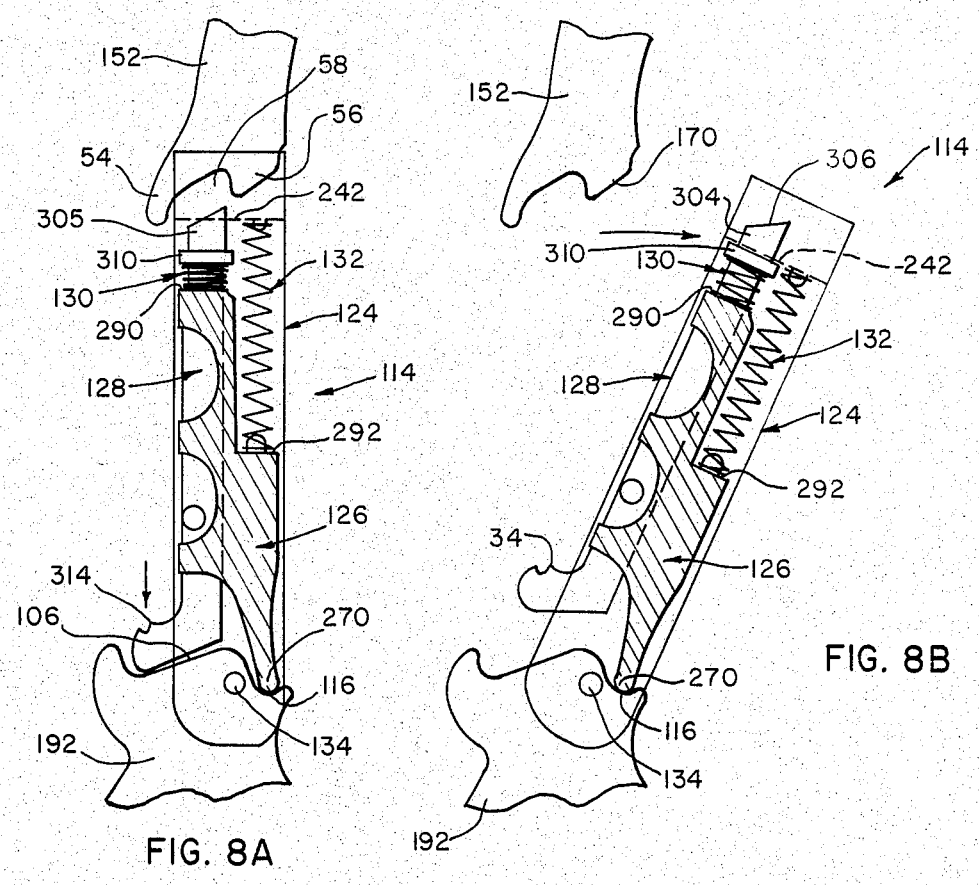
FIG. 8A
FIG. 8B

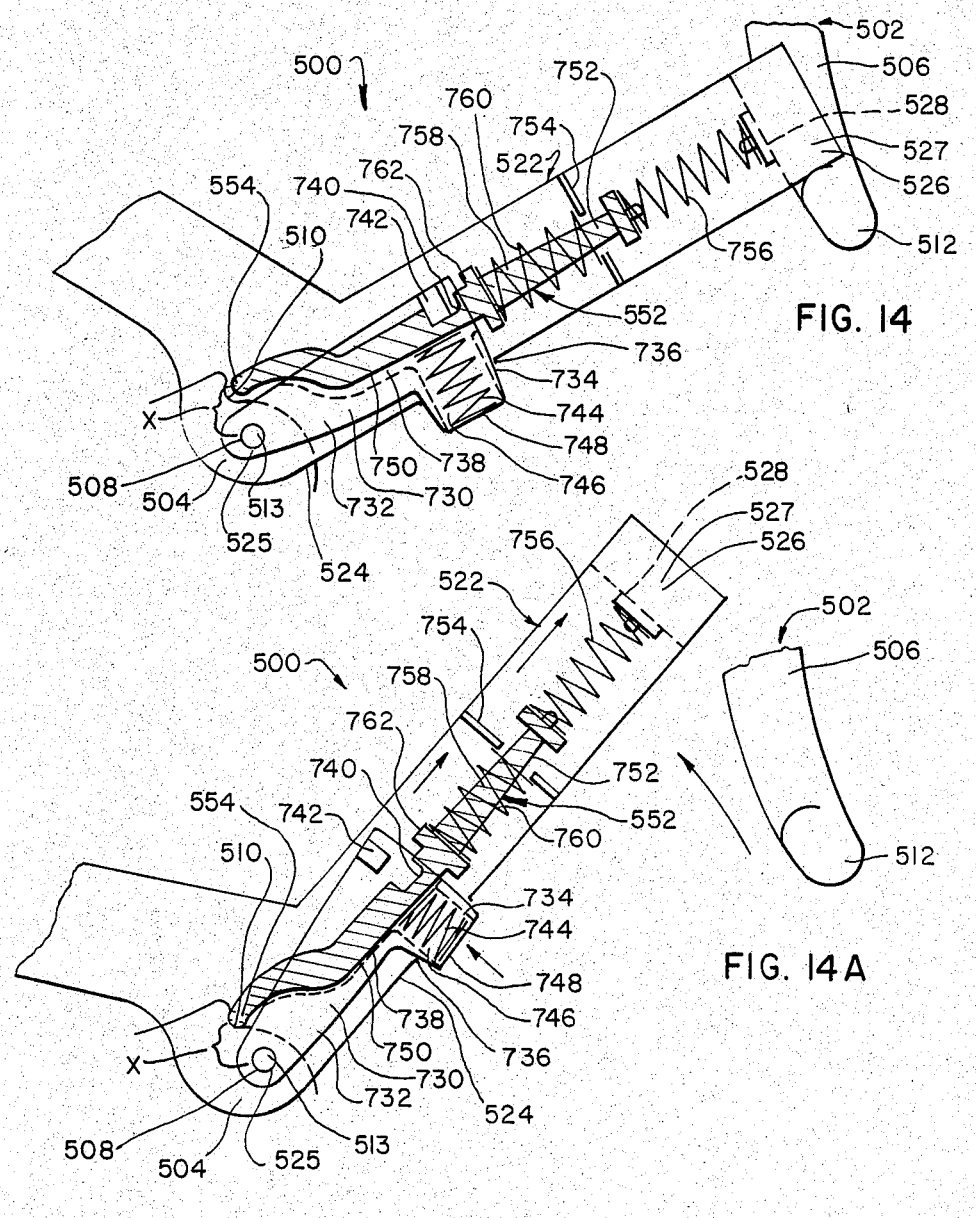
FIG. 14
FIG. 14A
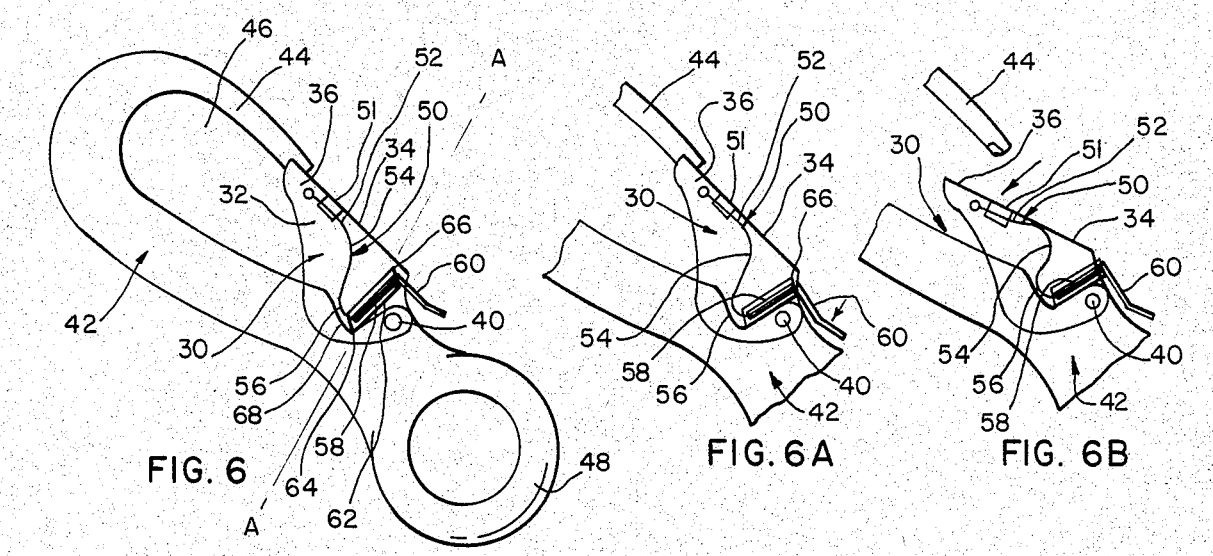
FIG. 6
FIG. 6A
FIG. 6B

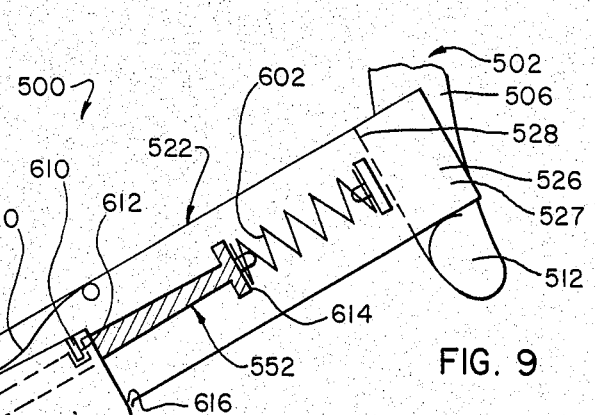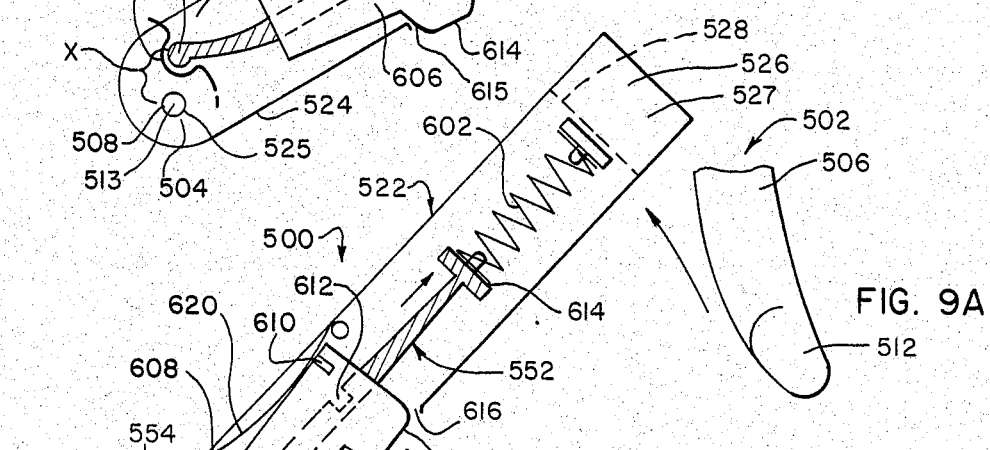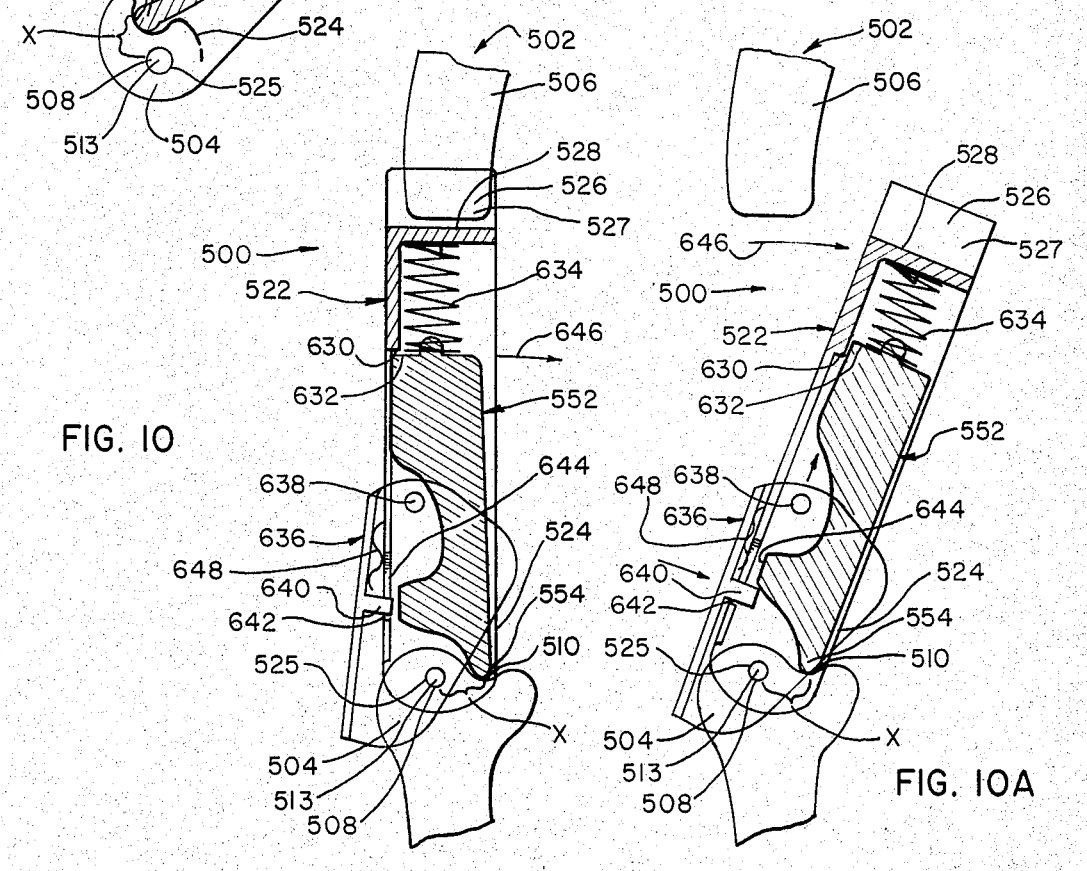

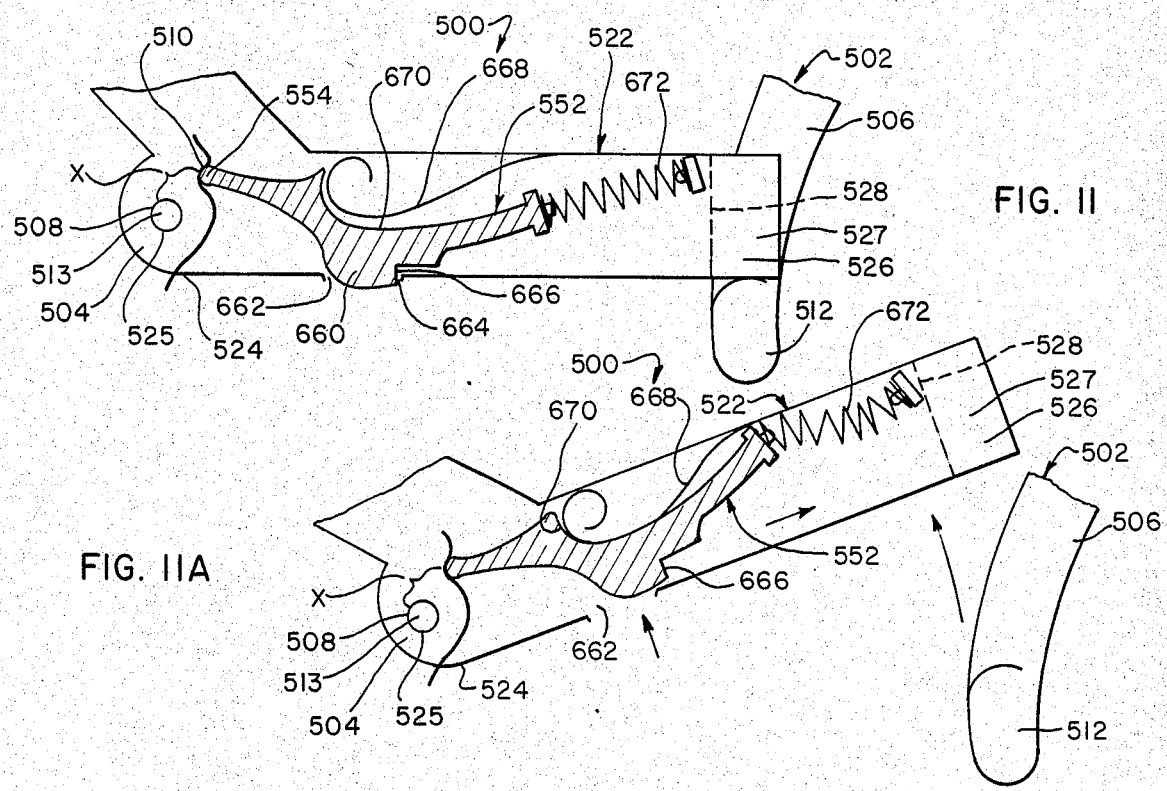
FIG. 11
FIG. 11A
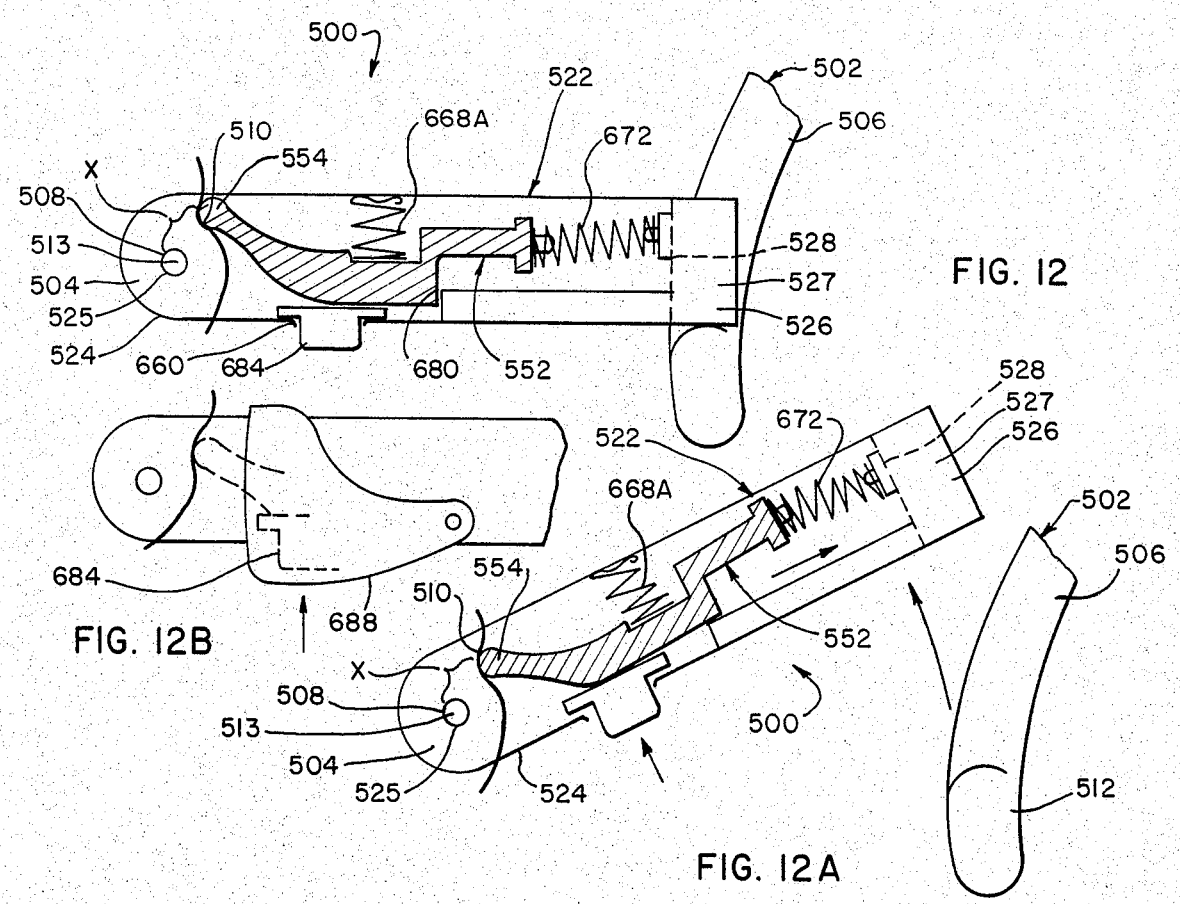
FIG. 12
FIG. 12B
FIG. 12A

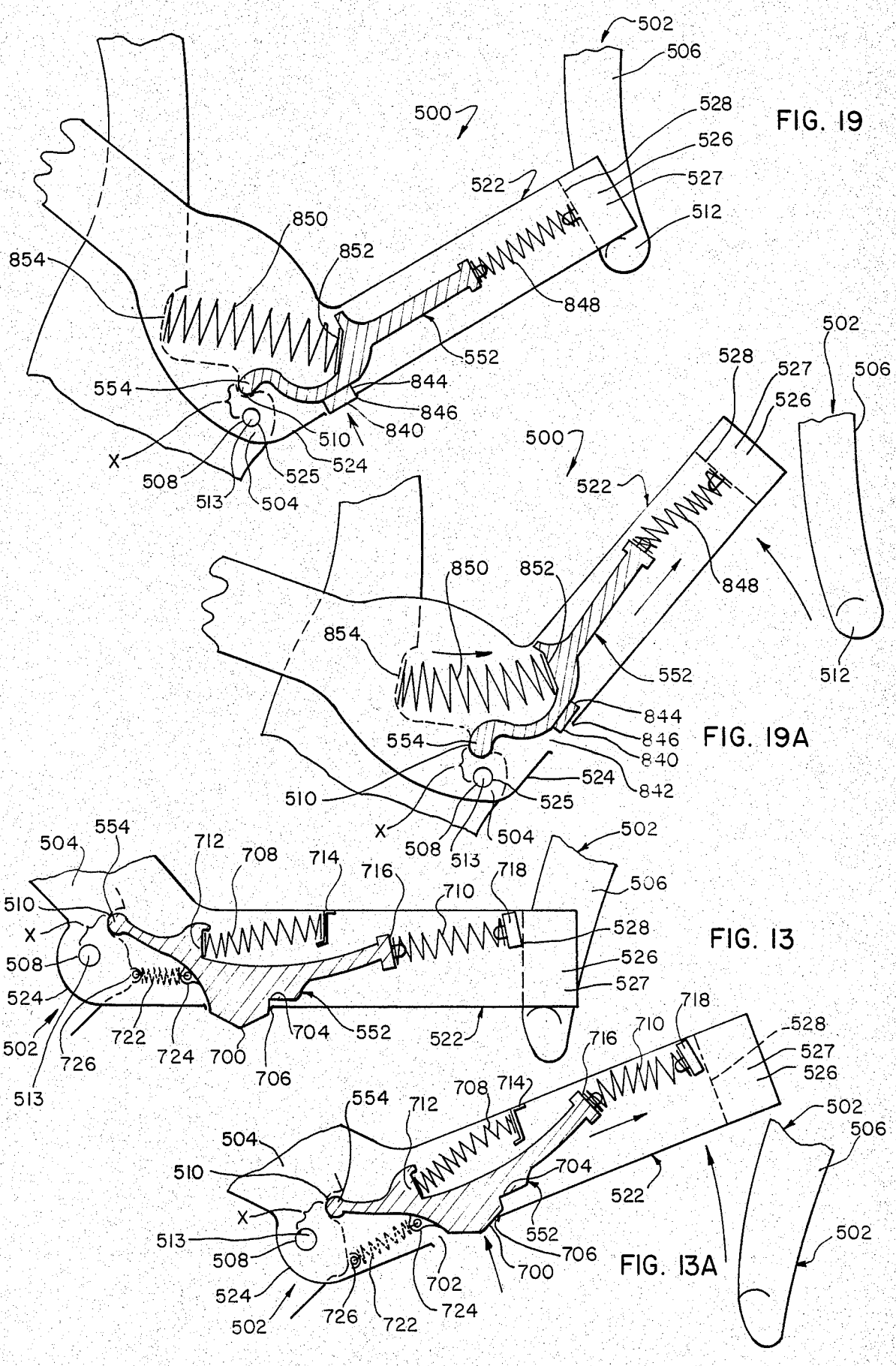

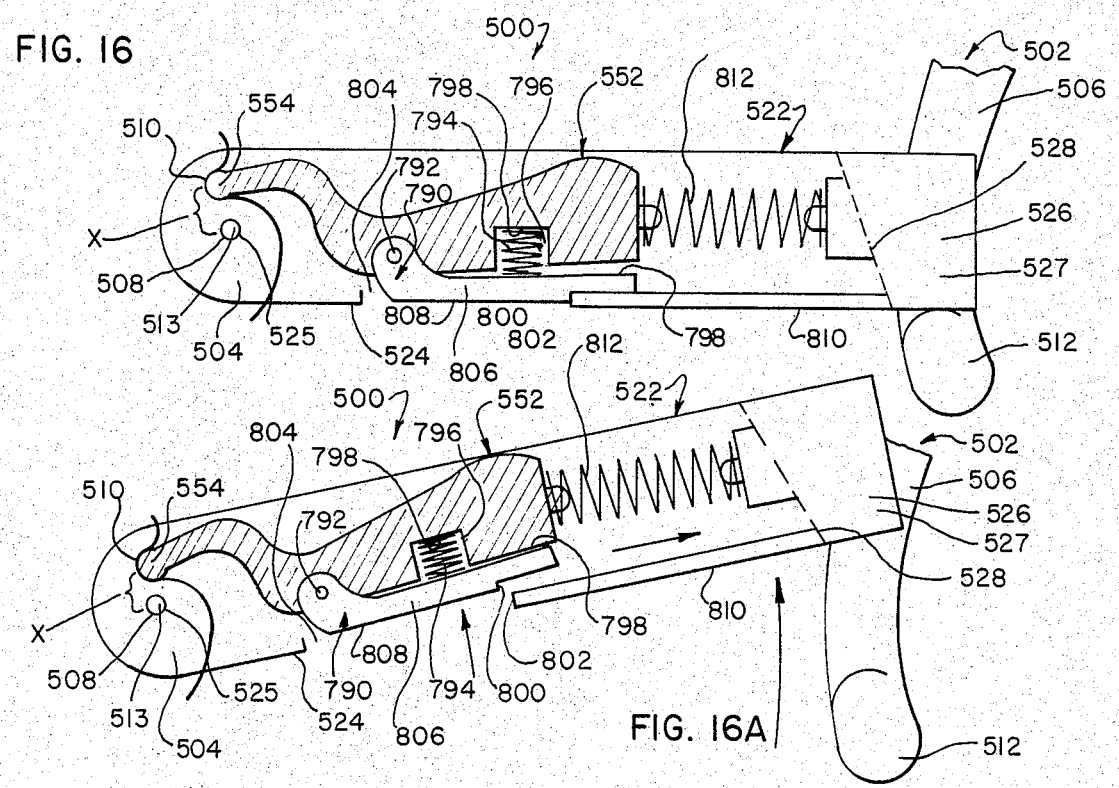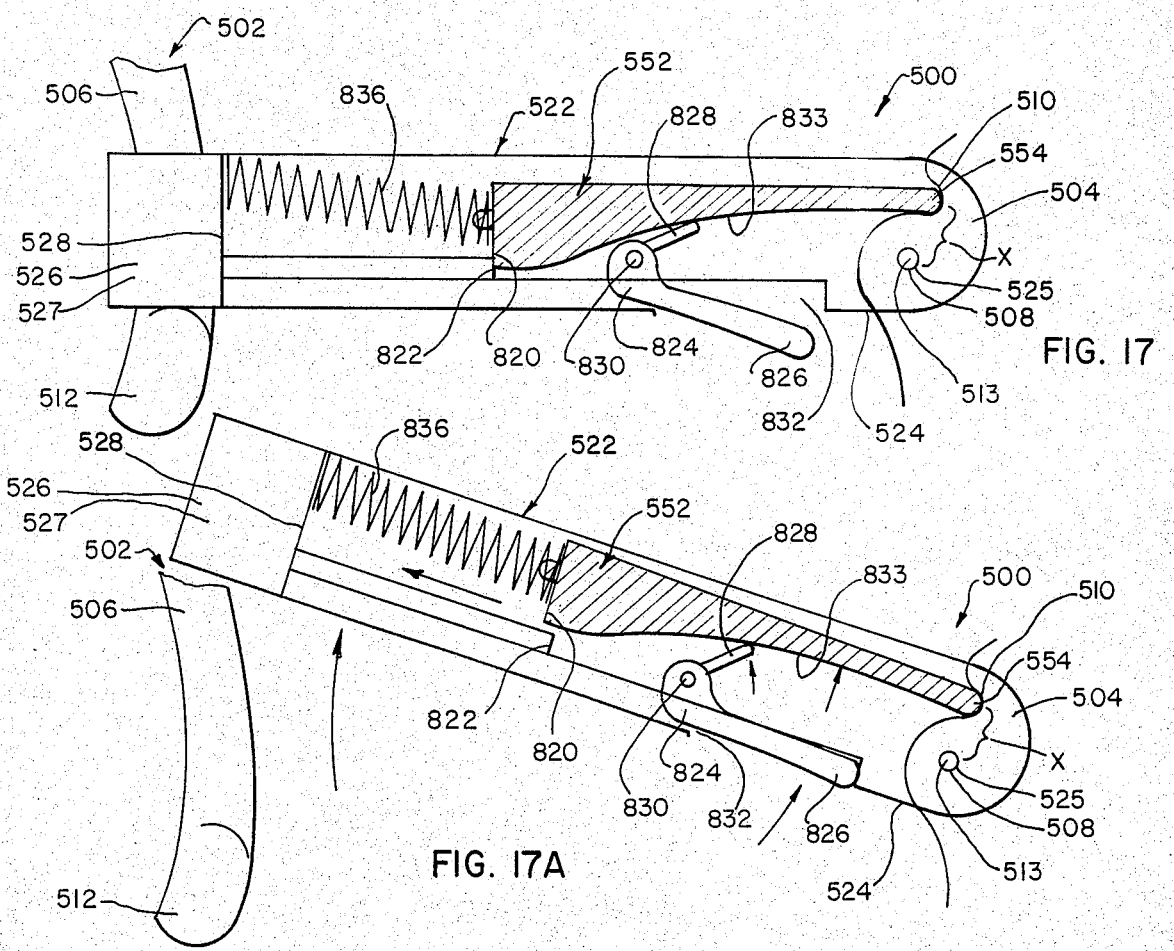

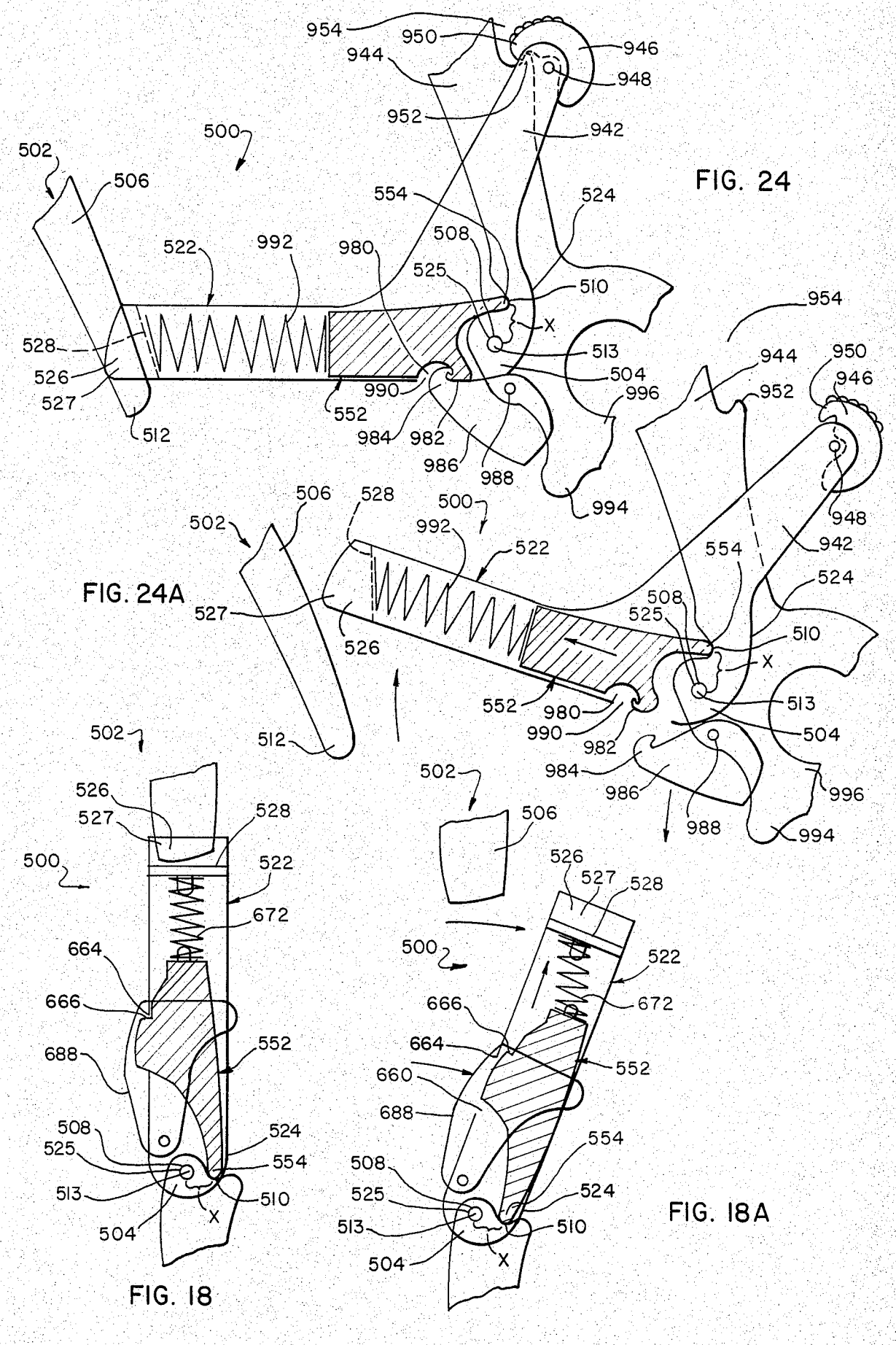

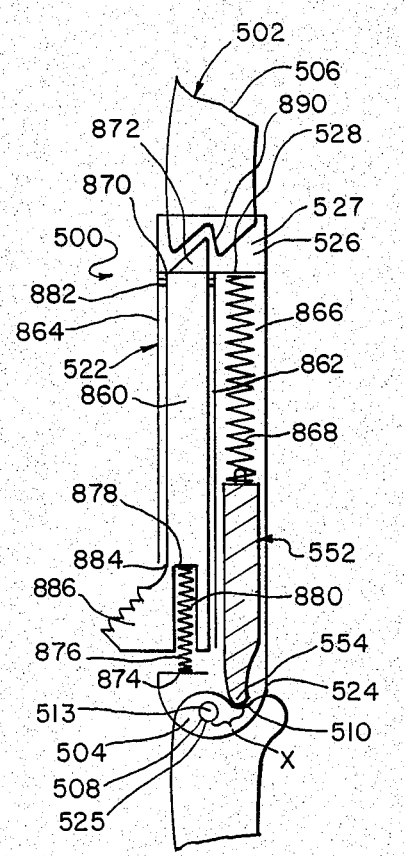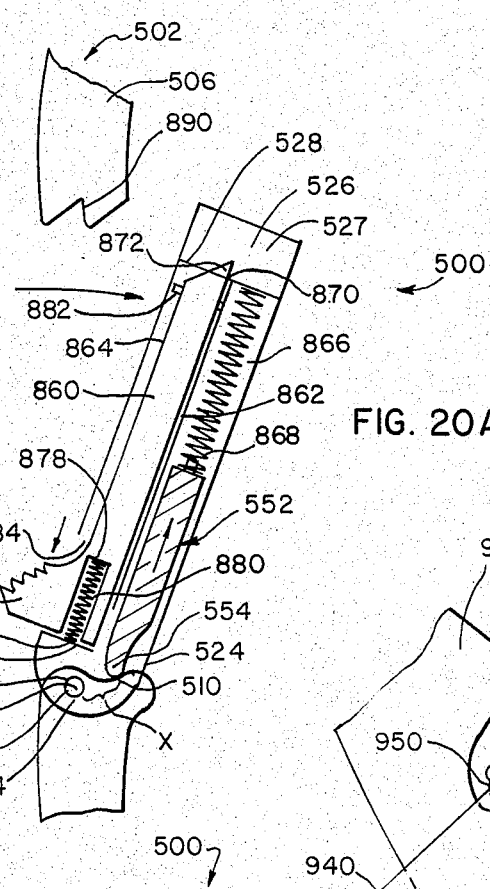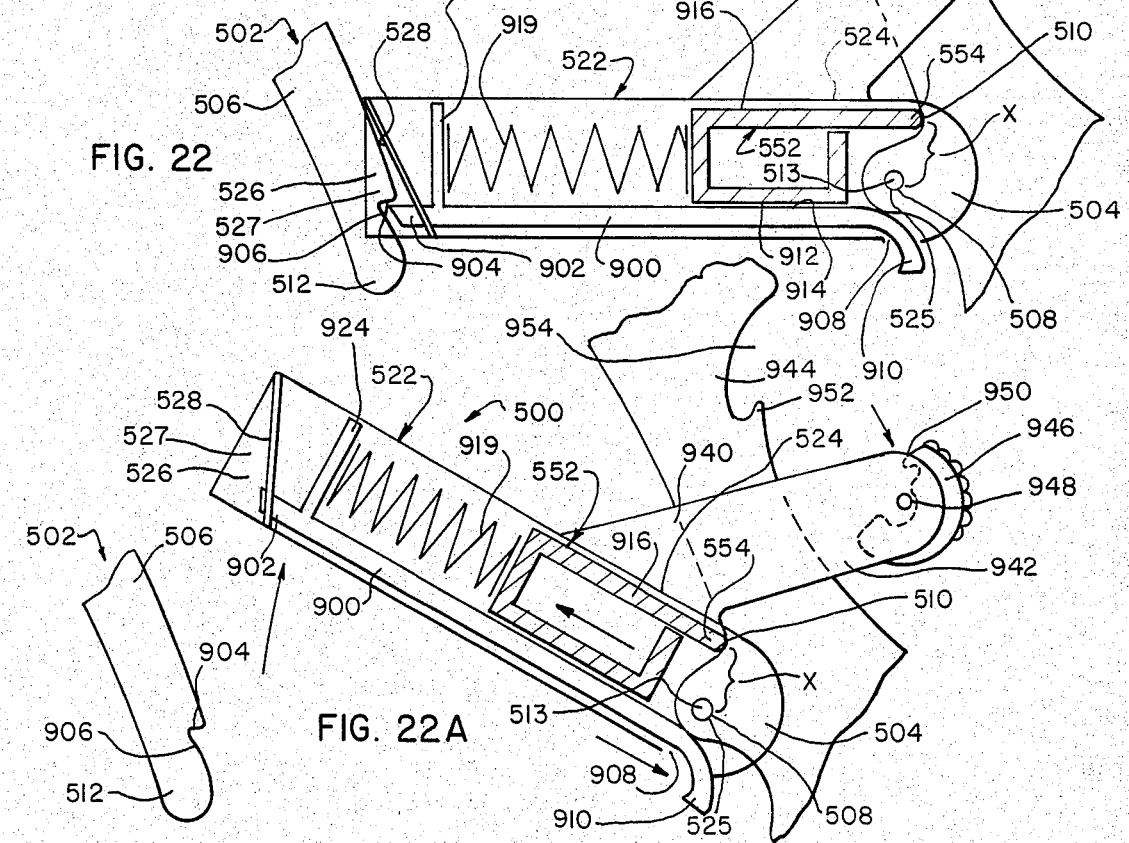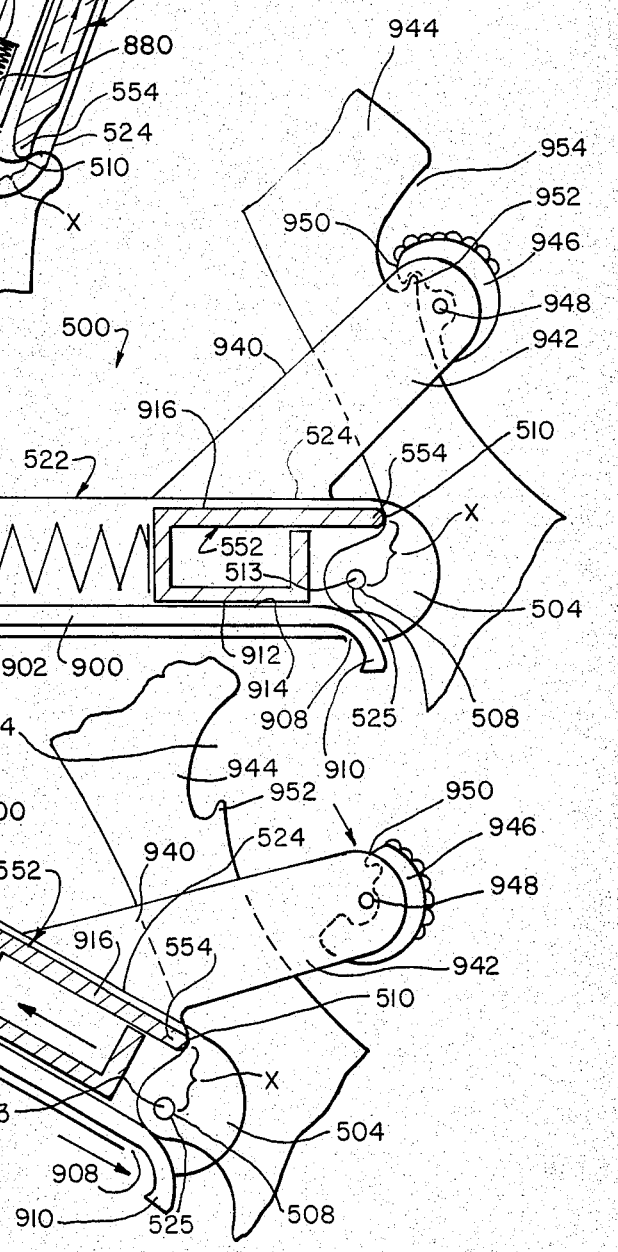
FIG. 20
FIG. 20A
FIG. 22
FIG. 22A

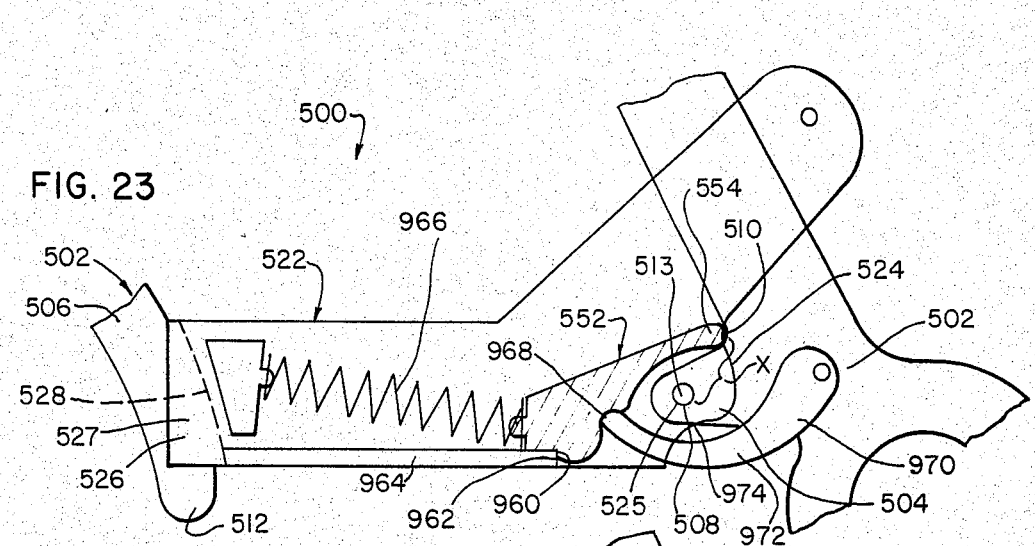
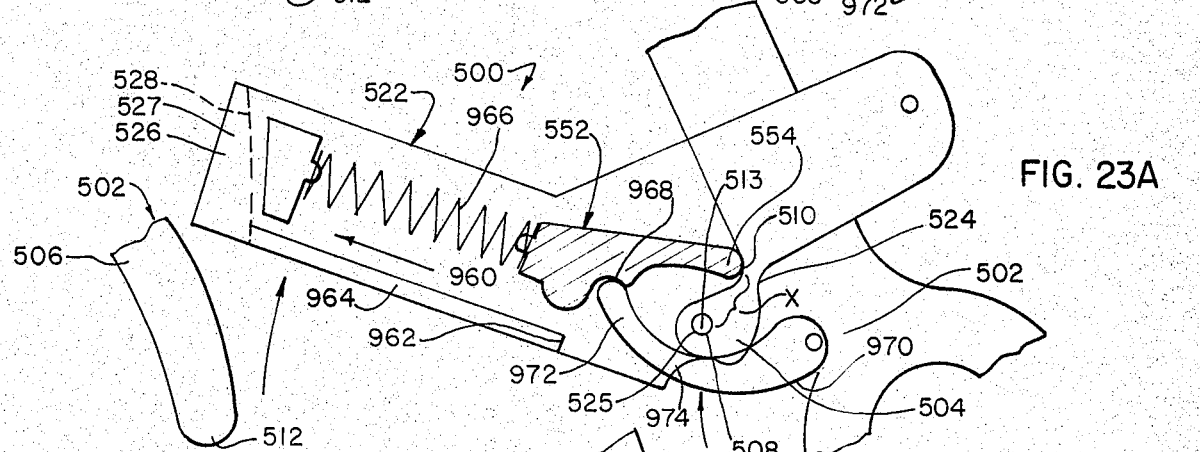
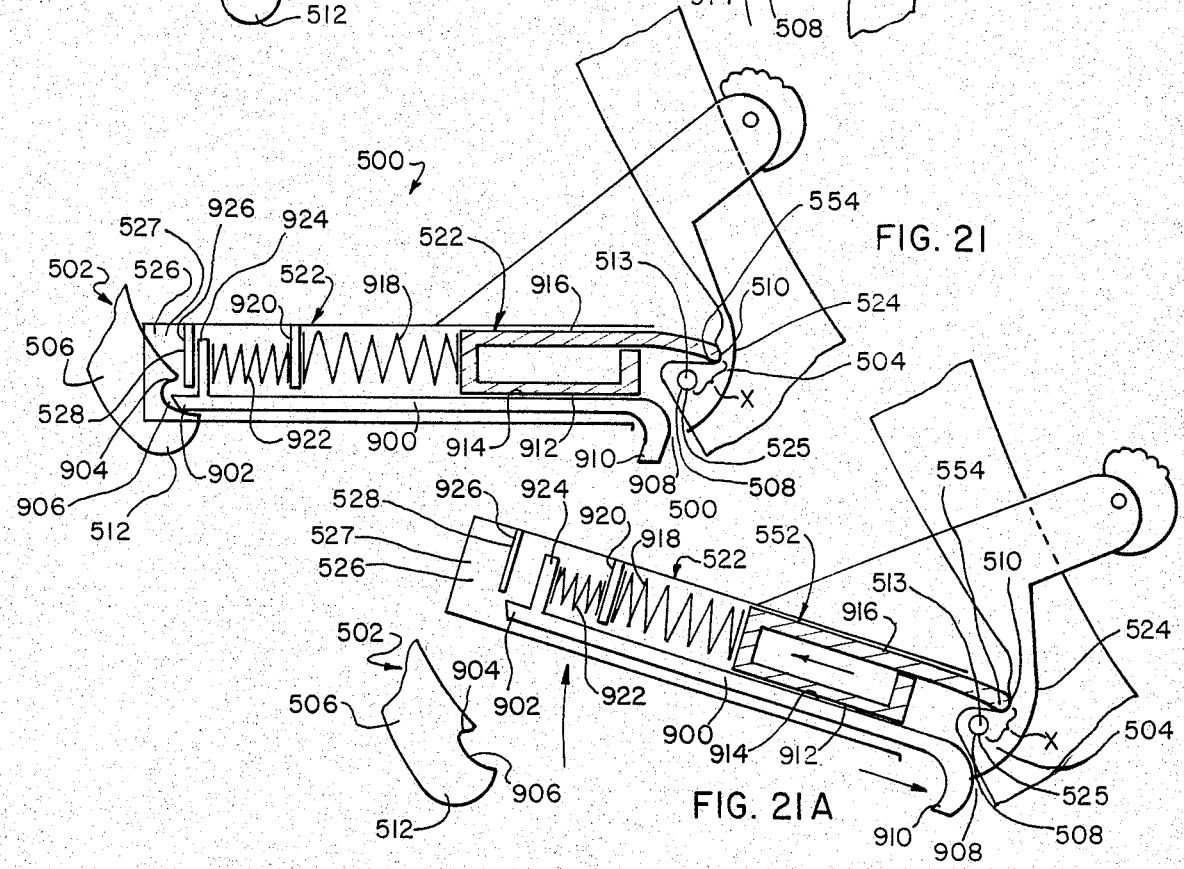

LOCKING SNAP HOOK

This is a continuation-in-part of U.S. patent application Ser. No. 433,873, filed Oct. 13, 1982.

BACKGROUND OF THE INVENTION

Field of the Invention

The present invention relates to snap hook connectors for use in linking rope, cable, chain, or other lines one to another or to other components of a system and more particularly to snap hook connectors having a spring biased latching mechanism wherein such latching mechanism is locked against unintentional opening and thereby inadvertent release of the linkage.

There is a great variety of available snap hooks with spring biased latching for connecting lines to receiving connectors, devices or other lines. In particular, where attachment of a line to a connector, device or other line is important in, for example, personal fall protection equipment, it is desirable to have a snap hook connector which is capable of easy actuation for engagement and disengagement while providing a secure latching and locking function. This is necessary to prevent inadvertent opening (unlatching) of the latch and possible disengagement from whatever object to which the snap has been attached. Conventional snaps have typically used latches which are spring biased in the latched position with an inverted U-shaped latching member or gate that is pivoted at one end about a pin or axis received through the body of the snap and is urged by arcuate movement into latched engagement by a spring bearing on the body of the snap and the top of the inside of the U-shaped member. The physical shape of the tip or nose of the hook body engaging the tongue of the U-shaped member and the member itself are generally preselected to cooperate with each other to prevent lateral forces from disengaging the gate from the closed (latched) condition. Such devices have generally been used with great success, however some conditions are encountered in use where the spring biased latching member or gate can be inadvertently depressed so as to disengage the aforementioned latching relationship and even depress the spring biased latching member sufficiently to permit the line or connector or other object to which the snap is attached to slip free from the snap under some circumstances. This can defeat the latching function of the snap and produce undesirable results depending on the application.

It is therefore an objective of the present invention to provide a snap with a latching function of the previously employed U-shaped member with one or more additional locking mechanisms that avoids the problems of inadvertent opening of the spring biased latching mechanism previously widely used.

In addition it is an objective of the present invention to provide a spring biased latching member that in concert with one or more additional locking mechanisms provides the desirable feature of one-handed operation, with either thumb or finger actuation.

BRIEF DESCRIPTION OF THE INVENTION

FIG. 5 is a partially broken view of another embodiment of the invention in a latched and locked position.

FIG. 5A is a partially broken view of the embodiment of FIG. 5 of the invention in an unlocked, unlatched position.

FIG. 6 is a partially broken view of another embodiment of the invention in a latched and locked position.

FIG. 6A is a partially broken view of the embodiment of FIG. 6 of the invention in a latched, unlocked position.

FIG. 6B is a partially broken view of the embodiment of FIG. 6 of the invention in an unlocked, unlatched position.

FIG. 8A is a partially broken view of the invention illustrated in FIGS. 7 and 8 in a latched, unlocked position.

FIG. 8B is a partially broken view of the invention of FIGS. 7, 8 and 8A in an unlocked and unlatched position.

FIG. 9 is a partially broken view of another embodiment of the invention in the latched and locked position.

FIG. 9A is a partially broken view of the embodiment of FIG. 9 of the invention in an unlocked, unlatched position.

FIG. 10 is a partially broken view of another embodiment of the invention in the latched and locked position.

FIG. 10A is a partially broken view of the embodiment of FIG. 10 of the invention in an unlocked, unlatched position.

FIG. 11 is a partially broken view of another embodiment of the invention in the latched and locked position.

FIG. 11A is a partially broken view of the embodiment of FIG. 11 of the invention in an unlocked, unlatched position.

FIG. 12 is a partially broken view of another embodiment of the invention in the latched and locked position.

FIG. 12A is a partially broken view of the embodiment of FIG. 12 of the invention in an unlatched, unlocked position.

FIG. 12B is a partially broken view showing a housing means which may be used with the invention of FIGS. 12 and 12A.

FIG. 13 is a partially broken view of another embodiment of the invention in the latched and locked position.

FIG. 13A is a partially broken view of the embodiment of FIG. 13 of the invention in an unlocked, unlatched position.

FIG. 14 is a partially broken view of another embodiment of the invention in the latched and locked position.

FIG. 14A is a partially broken view of the embodiment of FIG. 14 of the invention in an unlocked, unlatched position.

FIG. 16 is a partially broken view of another embodiment of the invention in the latched and locked position.

FIG. 16A is a partially broken view of the embodiment of FIG. 16 of the invention in an unlocked, unlatched position.

FIG. 17 is a partially broken view of another embodiment of the invention in the latched and locked position.

FIG. 17A is a partially broken view of the embodiment of FIG. 17 of the invention in an unlocked, unlatched position.

FIG. 18 is a partially broken view of another embodiment of the invention in the latched and locked position.

FIG. 18A is a partially broken view of the embodiment of FIG. 18 of the invention in an unlocked, unlatched position.

FIG. 19 is a partially broken view of another embodiment of the invention in the latched and locked position.

FIG. 19A is a partially broken view of the embodiment of FIG. 19 of the invention in an unlocked, unlatched position.

FIG. 20 is a partially broken view of another embodiment of the invention in the latched and locked position.

FIG. 20A is a partially broken view of the embodiment of FIG. 20 of the invention in an unlocked, unlatched position.

FIG. 21 is a partially broken view of another embodiment of the invention in the latched and locked position.

FIG. 21A is a partially broken view of the embodiment of FIG. 21 of the invention in an unlocked, unlatched position.

FIG. 22 is a partially broken view of another embodiment of the invention in the latched and locked position.

FIG. 22A is a partially broken view of the embodiment of FIG. 22 of the invention in an unlocked, unlatched position.

FIG. 23 is a partially broken view of another embodiment of the invention in the latched and locked position.

FIG. 23A is a partially broken view of the embodiment of FIG. 23 of the invention in an unlocked, unlatched position.

FIG. 24 is a partially broken view of another embodiment of the invention in the latched and locked position.

FIG. 24A is a partially broken view of the embodiment of FIG. 24 of the invention in an unlocked, unlatched position.

DETAILED DESCRIPTION OF THE INVENTION

Figures 1, 4:
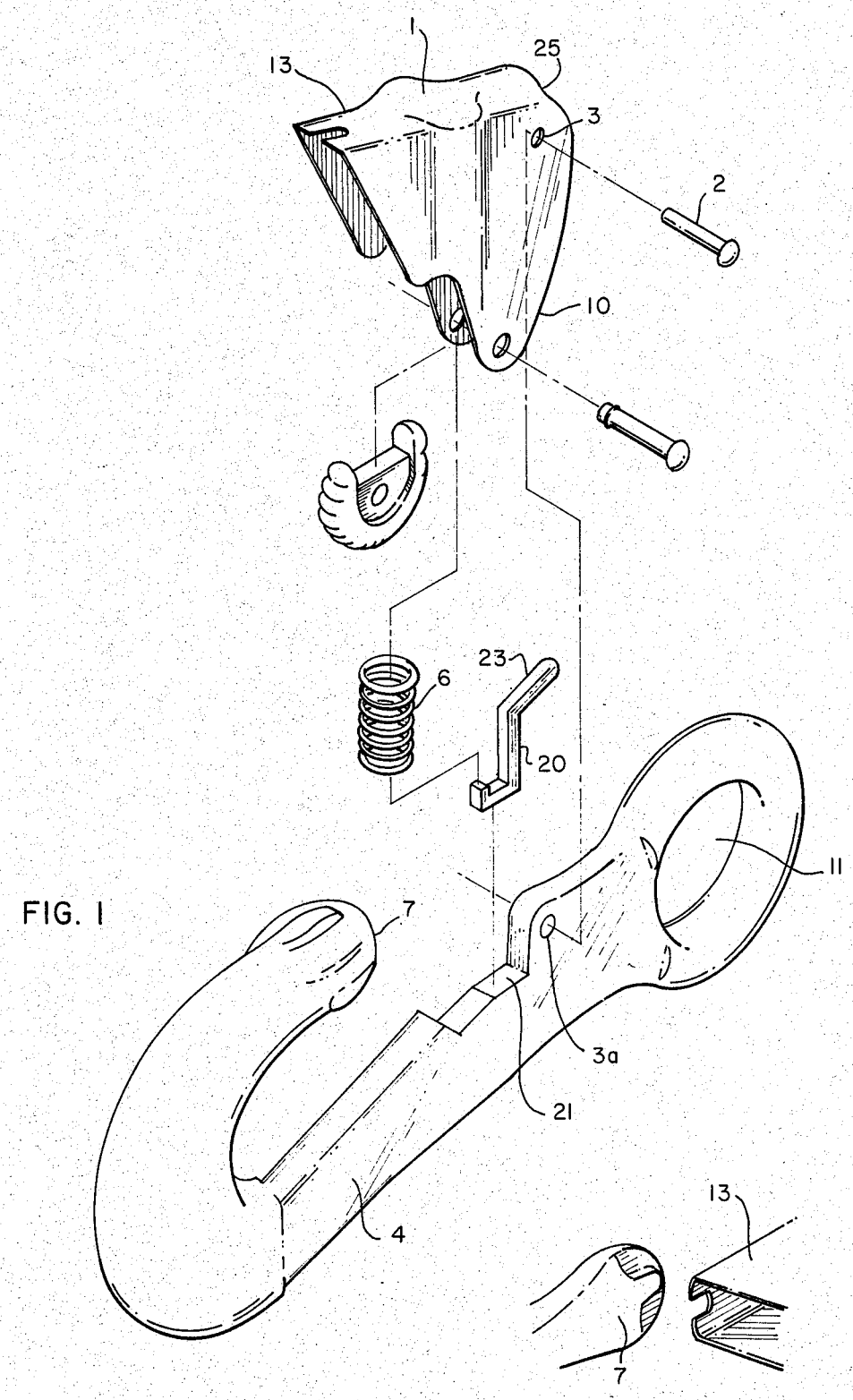
FIG. 1 is an exploded perspective view of the component parts of the latching and locking mechanisms of the present invention.
FIG. 4 is a fragmentary view of the nose of the snap hook showing the engagement structure contained therein and the complementary shape of the U-shaped latch member.

In FIG. 1 the exploded component parts of the locking snap of the present invention are shown. The inverted U-shaped latching member or gate 1 is arcuately pivoted about a pivot pin 2 received in the holes 3 in gate 1 and a hole 3a in the body of hook 4. The gate 1 is also sized so as to permit the arms of the open U-shaped cross-section to protrude beyond the bottom of hook body 4 a sufficient distance to provide an extension which can be finger or thumb actuated at 10 (or the grip 30) so that a hand holding the hook body 4 and the line which is received through the hole 11 can actuate the spring biased latching member 1 by rotating the latching member 1 about the pivot pin 2 such that the tongue 13 of the latching member 1 is moved inwardly thereby compressing the latching spring 6, providing an opening between the nose 7 of hook body 4 and the gate 1 so as to receive a connector, line or other fixture. When actuated as described the snap hook is able to receive a line, fastening ring or the like or enable the user of the hook to disengage the hook from whatever fixture or line to which it was attached.

An important and novel feature of the present invention is the provision of the previously described structure with a generally J-shaped locking member 20, having a lateral extension 23.

Figure 2:
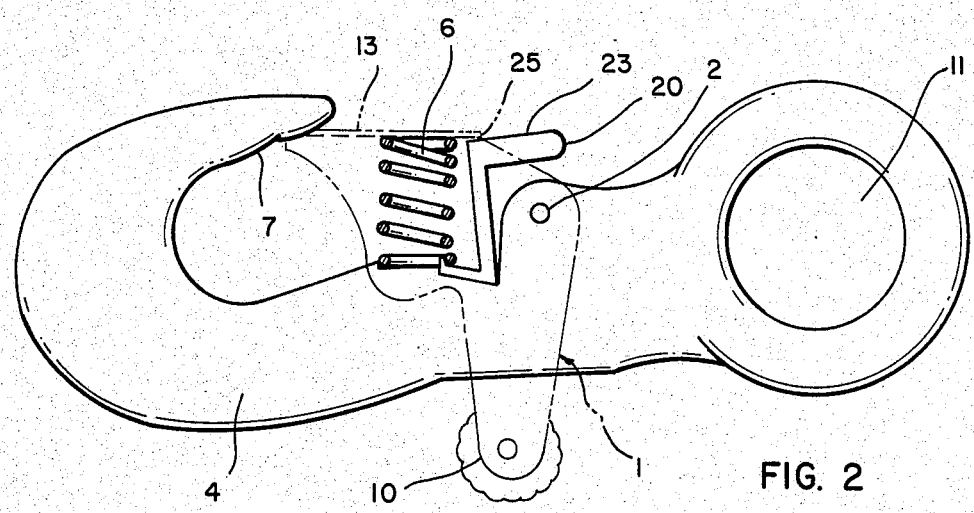
FIG. 2 is a partially broken view of the components in place which provide the latching and locking function of the snap of the present invention in a latched and locked position.

This member 20 is shaped to be received within the U-shaped latching member or gate 1, so that the heel of the J-shaped member engages a pocket 21 (as shown) which is provided in hook body 4. The bottom hook-shaped portion of the J-shaped member 20 is also adapted to engage at least one coil of the spring 6 and the lateral extension of the top of the J-shaped member is adapted to engage the edge 25 of the U-shaped latching member 1 where shown at 25 in FIG. 2. The size and position of the J-shaped member 20, the depth of the pocket 21, its shape in relationship to the shape of the heel of the J-shaped member and the distance of the pocket 21 to the lip of the edge 25 in combination with the dimension of the vertical arm of the J-shaped member 20 are all preselected to provide the following described function. When the J-shaped member 20 is in its normal locked position, as shown in FIG. 2, it is urged into this position by the biasing force of the spring 6 on the portion of the hook-shaped portion of member 20 engaging the spring 6. In this position the lateral extension 23 of the T-shaped top of the J-shaped member 20 interferes with the rotation of U-shaped latching member 1 so as to prevent the opening of the nose portion 7 of hook body 4. When the exposed portion of the lateral extension of J-shaped member 20 is physically depressed toward the hook body 4, it is arcuately moved by the heel pivotally moving in pocket 21 to a position where the surface of 23 no longer interferes with surface 25 and the depression of the portion 13 of spring biased latching member 1 is possible. The opening of the hook portion is then accomplished as in FIG. 3 when the spring 6 is depressed so that the snap hook 4 can receive or discharge a line, fixture or the like (not shown) simply by physically pushing down on the portion of latching member 1 as done with a conventional spring biased snap hook or by pulling back, toward the hole 11 in the hook body 4, on the exposed portion 10 of latching member 1, for example with the users thumb or forefinger depending on how the hook is held.

In operation, simply depressing the exposed portion of J-shaped member 20 and rotating tongue portion 13 away from hook nose 7 enables the user of the snap hook of the present invention to engage the hook or disengage the hook. In addition, the provision of an extension of the latching member 1 below the lower extremity of the hook body 4 of the hook in the manner shown permits one-handed operation of the snap hook once the J-shaped member has been activated by depressing the lateral extension 23.

The locking snap hook of the present invention can be used in circumstances where it is inconvenient or otherwise undesirable to tolerate two handed operation of a snap i.e. where the connector, rope or other fixture to which it is to be attached has to be secured against unwanted movement as by holding during the engagement of the snap. Further, the device of the present invention, as described, can be constructed so that the lateral extension of the locking member when depressed can be brought into close proximity to the body of the snap and the other elements sized within modest manufacturing tolerance requirements so as to provide a structure with few open areas. In addition, the extension of the arms of the inverted U-shaped member beyond the lower extremity of the snap body (as shown) can be variously sized and shaped for convenient actuation by the user. The device described is capable of being manufactured in a wide variety of sizes for particular uses or applications which favor the use of a snap hook using the structure described. Further, the shape of the nose of the snap hook shown in FIG. 4, provides for restraint of lateral movement of the tongue of the latching member.

The structure shown is capable of performing the described function in particular applications by the selection of a wide variety of materials whose physical properties are structurally and functionally capable of fulfilling the particular design requirements of use. A wide variety of metals and other materials are therefore contemplated to be capable of use in various components of the present invention. Likewise, the specific form of any part of the structure may be changed, for example the coil spring may be substituted with a wide variety of spring structures with whatever attendant changes that would require without departing from the spirit of the invention as described herein.

Other Embodiments

As illustrated in FIGS. 5 and 5A, the snap hook of the present invention may comprise an inverted U-shaped latching member gate 1 arcuately pivoted about a pivot pin 2 received in opposite holes in the latching member or gate 1 and in hook body 4. Latching member 1 is sized to permit arm portions thereof to extend adjacent to lateral side surfaces of the hook body 4. In a preferred embodiment the arm portions extend a sufficient distance to provide an extension which may be a finger or thumb actuated at 10 to cause rotation of the latching member 1 in the same manner as described above with reference to FIGS. 1–3. A different feature of this embodiment is that the generally J-shaped locking member 20 having lateral extension portion 23 comprises a laterally extending pan portion 12 which receives an entire end portion of spring 6 thereon in bearing relationship at the upper surface thereof. The spring is retained on the pan portion 12 by retaining means such as a centered nub 17. Another difference in this embodiment is that a latch load supporting portion 14 of the J-shaped member 20 extending between the two laterally extending portions 12 and 23, may comprise holes or other pin receiving means therein to allow pivotal attachment of the J-shaped member to the hook body 4. The pinning may be accomplished by a pinning structure such as upwardly extending clevis portions 16 positioned at either side of J-shaped member 20 having coaxial aligned holes therein which may be aligned with a hole (not shown) in the J-shaped member and pivotally attached as by pivot pin 15. The spring engaging J-shaped member may thus be pivoted between a first normally locked position illustrated in FIG. 5 with pan portion 12 in abutting contact with flat recessed pan receiving surface 21 and a second unlocked position such as the one illustrated in FIG. 5A with a surface of the load supporting portion 14 in abutting contact with another surface 19 of the hook body 4 and with pan portion 12 rotated upwardly with respect to recess surface 21 about the pivot axis provided by pin 15.

Figure 3:
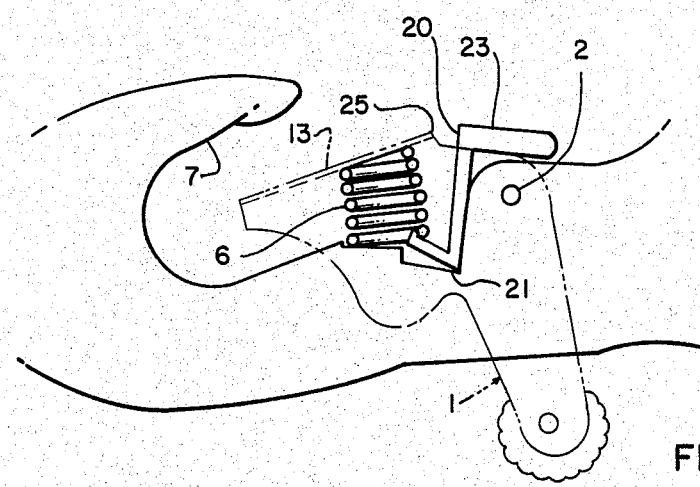
FIG. 3 is a partially broken view of the components in place which provide the latching and locking function of the snap of the present invention in an unlocked and unlatched position.

Another difference between the embodiment illustrated in FIGS. 5 and 5A and that illustrated in FIGS. 1–3 is provided by a latch downwardly extending contact surface 18 which may be provided in the upper surface of the latch member 1 between the latch arms as by coining, dimpling, or other conventional metal forming techniques well known in the art. By providing such a downwardly extending surface 18, the point of contact between the latching member 1 and the J-shaped locking member 20 may be moved inwardly or outwardly on the latch member from the previously discussed contact point immediately adjacent edge portion 25. Such an inward positioning of the contact point 18 facilitates load distribution over a somewhat larger portion of the latching member 1 upper surface. The use of a contact surface 18 which is provided by dimpling or other such techniques also facilitates fabrication of the snap hook body for providing a means of adjusting tolerances between the latching member 1 and the locking member 20. For example, when the latching member 1 is press formed by a powder molding technique, the length of downward extension of the downwardly extending contact surface 18 may be controlled by the use of various sized shims placed within the mold. Such a technique is very cost effective as compared to the cost of machining surface 21 of hook body 4 to obtain the desired tolerances. By allowing the construction of the snap hook with tighter tolerances, the positioning of tongue portion 13 relative the hook nose 7 in the locked position illustrated by FIG. 5 is also facilitated. If any gap which might be caused by tolerances between surface 18 and the upper end surface of member 20 load supporting portion 14 is reduced, then the amount of play between the tongue 13 and nose 7 is correspondingly reduced. Such a result is generally desirable to prevent intrusion of foreign matter between the latching surfaces of nose portion 7 and tongue portion 13. The use of a pinning arrangement such as provided at clevis 16 also facilitates tolerance control by providing a fixed relationship between the pivot location of the J-shaped locking member 20 and the pivot location of the latching member 1.

As illustrated by FIGS. 6, 6A, and 6B a snap hook performing the same generally locking function as the embodiments described above may be provided with a leaf spring arrangement in place of a coil spring and spring engaging member. As shown in FIG. 6, the snap lock may comprise a U-shaped member 30 having parallel arm portions 32 attached by an arm connection portion 34. The U-shaped member may have a tongue area 36 at one end thereof for latchingly engaging a nose portion 44 of a snap hook body 42 to which the U-shaped latching member 30 is pivotally attached as by pivot pin 40. The snap hook body may have a curvilinear shape defining a hook enclosure 46 having an opening therein which is closed by the latching member 30 when it is located in a latched position. The hook body may comprise an attachment means for ropes or the like, such as an eyelet 48 which is integrally formed with the remainder of the hook body.

A curvilinear leaf spring 50 is positioned substantially within a space between the two parallel arms 32 of the U-shaped latch member 30. In a preferred embodiment the curvilinear leaf spring 50 lies substantially symmetrically between planes positioned perpendicular to the axis of rotation of the latch member 30. Leaf spring 50 may be a flat body of uniform thickness with a uniform width substantially equal to that of the spacing between the parallel arm portions 32 and aligned in perpendicular relationship with the arm portions. The curvilinear leaf spring 50 is fixedly attached to a lower surface of arm connection portion 34 by a conventional attachment means 51 such as solder, rivets, or other attachments means well known in the art. The attachments means 51 may be connected to a first linear portion 52 of the leaf spring 50 which is positioned in substantially parallel alignment with latch member arm connection portion 34. The leaf spring first linear portion 52 is integrally formed with a second relatively large radius bending portion 54 bending generally towards latch surface 34 and towards a hook body surface portion 68. Second relatively large radius bending portion 54 is integrally connected to a third relatively small radius bending portion 56 positioned relatively near hook body recess surface portion 68 and in turn integrally connected to a fourth generally linear portion 58 positioned in substantially perpendicular alignment with latch member arm connection portion 34. The fourth generally linear portion 58 extends upwardly from third portion 56 to a position in close proximity to the inner surface of latch member arm connection portion 34 where it is integrally connected at right angles to a fifth generally linear extending portion 60 which extends in generally parallel alignment with surface 34. A rigid member 62 which may be an elongate bar or the like may be fixedly attached as by solder or the like to fourth generally linear portion 58 of curvilinear leaf spring 50. The rigid member 62 is provided with opposite edge surfaces 64, 66 generally defining a straight line AA, FIG. 6, positioned in substantially perpendicular relationship to the inner surface of arm connection portion 34 when the latching member 30 is in a latched and locked position. When the snap hook is in the latched and locked position, illustrated in FIG. 6, rigid member lower edge surface 64 contacts hook recess surface 68 and rigid member upper edge surface 66 contacts the inner surface of arm connection portion 34 thereby interfering with an inward pivotal movement of U-shaped latch member 30.

As illustrated by FIG. 6A, a force may be applied to generally linear portion 60 in a direction generally perpendicular thereto and toward the hook body 42 which causes an outward bending deformation in third relatively small radius portion 56 of the leaf spring which causes upper edge portions 66 of rigid member 62 to be pivoted and displaced in a direction towards pivot pin 40. Edge surface 66 may be pivoted a sufficient distance by depression of fifth generally linear portions 60 to provide a clearance distance between upper edge surface 66 and connection surface 34 which allows inward pivotal movement of U-shaped latch member 30 when an inwardly directed force is applied thereto as illustrated in FIG. 6B. The inward pivotal movement of U-shaped latch member 30 as illustrated in FIG. 6B produces an elastic bending deformation, primarily in relatively large radius bending portion 54, of the curvilinear leaf spring 50. When the force causing inwardly movement of the latch member 30 is removed, the latch member is caused to pivot outwardly into the position illustrated in FIG. 6 by the elastic restoration movement of leaf spring 50. Similarly, curved portion 56 again resumes its unstressed state after the outside force is removed from linear portions 60, causing the leaf spring 50 and attached rigid member 62 to resume the position illustrated in FIG. 6.

In another embodiment (not shown) rigid member 62 is not used and leaf spring fourth generally linear portion 58 performs the identical function thereof.

The leaf spring arrangement shown is especially useful for smaller snap hook applications such as jewelry and the like where the production of a miniature coil spring would be difficult and expensive.

The latching and locking hook of the present invention may be provided in a wide variety of different configurations. For example, as illustrated in FIGS. 7, 8, 8A and 8B, a latching and locking hook comprising in general a hook body 112 and a spring biased latching and locking means 114 can be employed. The spring biased latching and locking means may comprise in general a latching member such as latch member 124 pivotally mounted on the hook body as by pivot pin 134; a plunger body 126 mounted within the latch member 124; a lock member 128 slidingly mounted within the plunger body 126; a lock member spring 130 mounted in circumscribing relationship about an upper portion of the lock member 128 and bearing on plunger body 126 and lock member 128 and shoulder portion 310; and a plunger body spring 132 mounted on a portion of the plunger body 126 and bearing on the plunger body and the latch member 124. Having thus described the components of the embodiment shown in FIGS. 7-8B in general, the structure of each of the components will now be specifically described.

Figure 7:
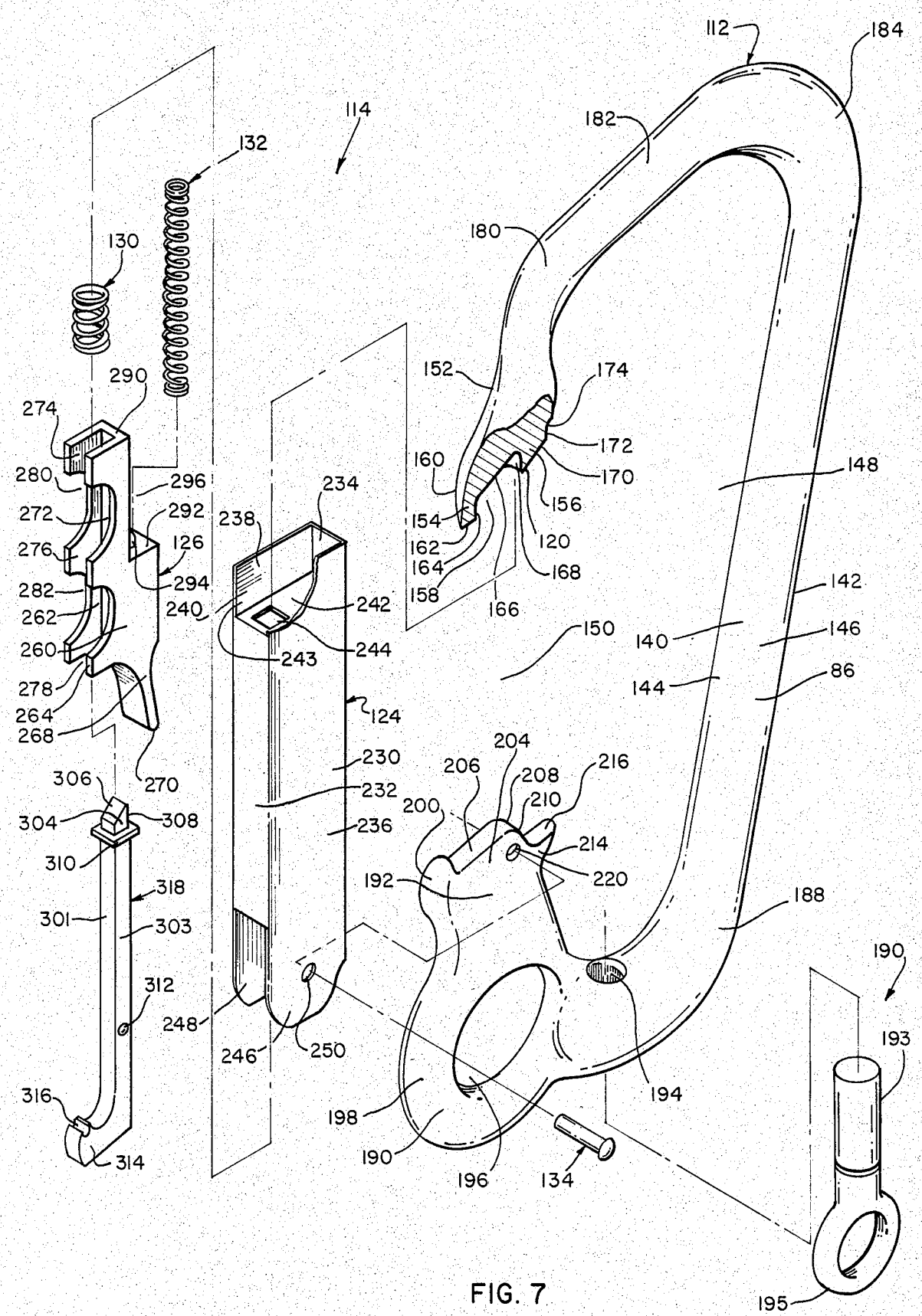
FIG. 7 is an exploded perspective view of another embodiment of the present invention.
Figure 8:
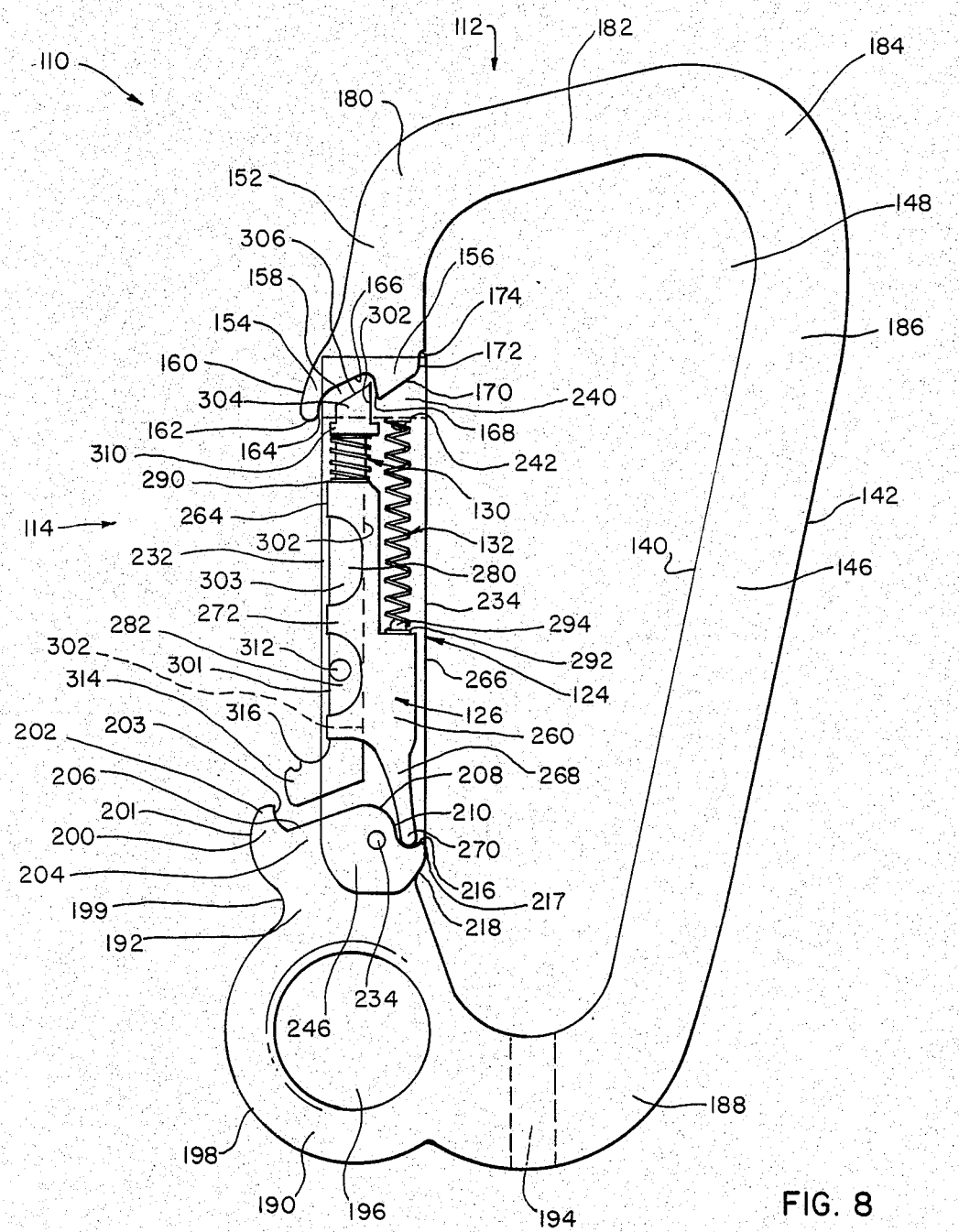
FIG. 8 is a partially broken view of the invention illustrated in FIG. 7 in a latched and locked position.

The hook body 112 as illustrated by FIGS. 7 and 8, is a curvilinear member having an inner surface 140 an outer surface 142 and lateral side surfaces 144, 146. The surfaces of the hook body as described herein may be of any geometric configuration such as a configuration having a generally rectangular cross section wherein the inner, outer and lateral side surfaces are generally planar or, for example, a circular cross section as illustrated in FIGS. 7 and 8, wherein the inner, outer and lateral side surfaces are continuous with no specific delineations therebetween. The hook shaped member and more specifically inner surface 140, defines an enclosure area 148 having an enclosure opening 150, FIG. 7, therein provided by opposed terminal surfaces of the hook body. For purposes of reference herein, a direction from a portion of the hook body towards the enclosure area 148 will be referred to as inward and the opposite direction will be referred to as outward; a direction toward the top of the drawing sheets of FIGS. 7 and 8 will be referred to as upward, and the opposite direction as downward; the surface of the hook and latch illustrated by the elevation view of FIG. 8 will be referred generally as the left lateral surface and the opposite surface as the right lateral surface; a direction which in FIG. 8 is from right to left on the sheet will be referred to as forward and the opposite direction as rearward. Of course these directions are for reference purposes only and are otherwise without significance.

As illustrated by FIGS. 7 and 8, the hook body 112 comprises a downwardly extending hook tip 152 having a hook tip forward nose portion 154 and a hook tip rear nose portion 156 defining a hook tip recess portion 158 therebetween. The lower portion of the hook tip comprises a plurality of integrally formed surfaces including a forward downwardly extending surface 160, a horizontally extending surface 162 an upwardly extending surface 164, and upwardly rearwardly extending surface 166, a downwardly extending surface 168, an upwardly rearwardly extending surface 170, an upwardly extending surface 172, and a small radius inwardly concave surface 174. Each of these surfaces may project uniformly from left lateral side to right lateral side across the hook tip 152. The hook body further comprises an upper forward curved hook body portion 180 integrally connecting the hook tip portion 152 with an upper rearwardly extending hook body portion 182 in turn integrally connected with a rear upper curved hook body portion 184. Rear upper curved portion 184 is integrally formed with downwardly extending body portion 186 which is integrally connected to lower curved portion 188. Lower curved portion 188 is integrally connected to upwardly extending eyelet portion 190 which is in turn integrally connected to upwardly extending latch mounting portion 192. Lower curved portion 188 may comprise a centrally positioned downwardly extending swivel hole 194 therein to facilitate mounting of the hook body on a swivel device 191, FIG. 7. The swivel device 191 may comprise a rigid shaft portion 193 which is received within swivel hole 194 in fixed relationship therewith as by mating threaded surfaces (not shown) provided on the shaft portion 193 surface, and hole 194 surface, or by welding or other fixed attachment means well known in the art. An eyelet portion 195 may be journaled to the shaft 193 to allow pivotal movement of the eyelet portion about the central longitudinal axis of the shaft portion 193. Thus, when swivel shaft portion is affixed within hole 194, eyelet 195 is swivelable relative the hook body 112. Upwardly extending eyelet portion 190 comprises an eyelet 196 therein formed by a generally torusial shaped outer surface 198 of the eyelet portion 190.

A forward section of the latch mounting portion 192 comprises an upwardly projecting neck portion 200 thereon which may comprise, as illustrated in FIG. 8, a forward arcuate surface 201, a top surface 202, and a downward extending surface 203. The neck 200 is integrally formed with a shoulder section of the upwardly extending latch mounting portion 192 which comprises a horizontally extending surface 206 inwardly connected with downwardly extending surface 203, a shoulder curved surface 208 integrally connected with surface 206 and a downwardly extending surface 210 integrally connected with shoulder curved surface 208. The upwardly extending latch mounting portion 192 further comprises an arm section 214 having an upwardly facing generally concave arm upper surface 216 integrally connected to downwardly sloping surface 210. Surface 216 is in turn integrally connected by a small radius connection surface 217 to downwardly extending arm surface 218. A pin hole 220 is provided extending between opposed lateral surfaces 144, 146 of the latch mounting portion 192 for receiving pivot pin 134 therein for mounting of latch member 124 as discussed in further detail hereinafter. The upwardly extending neck portion 200 serves to prevent a properly sized rope thimble, which may be attached through eyelet 196, from rotating upwardly and occupying a position generally in contact with shoulder surface 206 which would interfere with the operation of the latching and locking means 114. Concave arm surface 216 functions to receive and contain a rounded tip portion 270 of plunger body 126 thereon to facilitate pivotal movement of the plunger body as described in further detail hereinafter.

Latch body 124 as illustrated in FIGS. 7 and 8 comprises an elongate tubular configuration which in the preferred embodiment has a rectangular cross section. The latch member is formed by a forward wall 232, a rear wall 234, a left lateral sidewall 236 and a right lateral sidewall 238. A hook tip receiving portion 240 at the upper end of the latch member is formed by a transversely extending upper wall surface 242 and upper portions of left and right lateral side walls 236, 238 and rear widewall 234. The forward sidewall terminates at the transversely extending upper wall whereby a rectangular opening 243 is defined by edge surfaces of the transversely extending upper wall and the left and right lateral side walls. Left and right lower wing portions 246, 248 are defined by lower extensions of left and right lateral wall surfaces 236, 238. The wing portions have coaxially aligned holes 250 therein for receiving pivot pin 134 therethrough to pivotally mount the latch member 124 on the hook body mounting portion 192. The downward extension of the wing portions 246, 248 is sufficient to provide free pivotal movement of the latch member in clearing relationship with the hook body mounting portion 192 from the latched position illustrated in FIGS. 8 and 8A to an inwardly rotated unlatched position as shown in FIG. 8B. The longitudinal dimension of the latch member between pivot pin holes 250 and transversely extending wall 242 is such that the forward surface 232 of the latch member may make contact with upwardly extending surface 164 of the hook tip forward nose portion 154 at a position immediately below its intersection with the transverse wall 242. Thus the latch member is prevented from pivoting forwardly of the position illustrated in FIG. 8 by the abutting contact of the forward nose 154 and the latch member forward surface 232. The latch member is further preventing from pivoting forward of the position illustrated in FIG. 8 by the portion of rear wall surface 234 extending above transverse wall 242 which abuttingly engages hook tip rear upwardly extending surface 172 to further prevent forward rotation of the latch member. In one preferred embodiment, the dimensions of the latch member are such that hook tip surface 172 is engaged by latch member rear wall surface 234 prior to the contact of latch member forward wall 232 with surface 164. However, the dimensions of the latch member may be such that the two hook surfaces 164, 172 are engaged nearly simultaneously or may be such that surface 164 is contacted first. In any such arrangement it will be seen that a redundant configuration is provided for preventing the latch member from rotating forwardly of the position illustrated in FIG. 8. Hook top receiving portion 240 lateral sidewall extensions may engage lateral surfaces of nose portion 152 to resist lateral side loading of the latch member 124 when it is in the latched position shown in FIGS. 8 and 8A. A locking member transverse wall cut-out portion 244, FIG. 7, is provided for receiving a tip portion 304 of locking member 128 therethrough as will be discussed in further detail hereinafter.

As best illustrated in both FIGS. 7 and 8, the plunger body 126 comprises an elongate integrally formed member having left and right side walls 260, 262 and forward and rear side walls 264, 266, FIG. 8, adapted to be slidingly received within latch member 124, and elongate plunger arm portion 268 extends downwardly and rearwardly from the plunger body 126 and comprises a rounded end surface 270 at the bottom thereof. The plunger arm rounded lower end surface 270 bears on and rotates on arm upper concave surface 216 of the hook body. The plunger body 126 comprises a longitudinally extending channel portion 272 in a forward portion thereof. In a preferred embodiment the channel portion has a uniform rectangular cross section throughout its length. Channel forward cutout portions 274, 276, 278 allows the lock member 128 to be inserted into the plunger body at forward side thereof. Channel lateral cutout portions 280, 282 are provided in lateral sidewalls 260, 262 to facilitate removal of foreign matter which might interfere with the movement of locking member 128 within the channel. A forward upper surface 290 receives a lower surface of lock member spring 130 in abutting contact therewith and a rear upper surface 292 of the plunger body receives a lower surface of plunger body spring 132 in abutting contact therewith. Spring 132 may be retained on upper surface 292 by a spring retaining nub 294 thereon. A clearance space 296 is provided immediately above the rear upper surface 292 allowing spring 132 to be linearly positioned between surface 292 and a lower surface of latch member upper transverse wall 242. Lock member 128 has an elongate shape which may comprise an elongate square shaft portion 300, FIGS. 7 and 8, having forward 301, rear 302, left 303 and right (not shown) side surfaces. The elongate square shaft portion also comprises a beveled upper tip portion 304 having a forwardly downwardly extending upper surface 306. A shoulder may be provided proximate the tip portion as by a non integral clip 310 or the like. During construction the clip is placed on the elongate square shaft portion 300 after it has been inserted within plunger body 126 and after the square shaft portion 300 has received spring 130 thereabout. A movement restraining portion 312 such as may be provided by a nub integrally formed with the shaft portion 300 or alternatively by a pin inserted through a hole therein is provided extending from the either or both lateral side surfaces of the square shaft portion 300 at a position received within plunger body lateral side cutout portion 282. A trigger portion 314 may be integrally formed with the shaft portion 300 extending forwardly from the lower end thereof. A roughened grip surface 316 may be provided at an upper surface of the trigger portion 314. The elongate shaft portion 300 is of a size and construction whereby it fits in close sliding contact within plunger body channel portion 272. The positioning of the plunger body within the latch member is such that tip portion 304 of the lock member extends through transverse wall cutout 244. The cutout 244 is of a size and configuration allowing sliding movement of the tip 305 therein while preventing rotational movement of the tip about the longitudinal axis of the locking member 128. The construction and arrangement of the various locking hook components are such that, in a normally closed and locked position, the upper edge of the lock member 128 is positioned above the lower edge surface of hook tip rear nose portion 156. Thus lock member rear surface 302 abuttingly engages hook tip downwardly extending surface 168 to prevent rearward pivotal movement of the latch member 124 when the locking member 128 is in an upwardly biased locking position. Shoulder 310 facilitates the operation of locking member 128 by preventing upward motion of the member beyond a point where shoulder 310 contacts transverse latch wall surface 242. Shoulder 310 also abuts with an upper surface of lock spring 130 allowing a biasing force to be transmitted from the upper surface 290 of the plunger body to the lock member 128 when it is positioned in a lowered position as illustrated in FIG. 8A and for transmitting biasing force to the latch member at upper transverse surface 242 when the locking member is positioned in a raised position as illustrated in FIGS. 8 and 8B. Nub portion 312 prevents the locking member 128 from being moved downwardly beyond a point where the nub member contacts an edge to the spring 130 from over-compression and to prevent loss of capture of tip portion 304 of locking member from upper wall surface 242.

As best illustrated by FIG. 8A, the latching and locking means 114 is taken out of the locking position illustrated in FIG. 8, by a downward movement of locking member 128 within plunger body 126 which may be produced by a downward force on trigger 314 as by a downward movement of a human finger, thereon. The trigger in one preferred embodiment may be urged into contacting engagement with hook body upper shoulder surface 106 at which position the locking member 128 is sufficiently depressed to clear rear nose surface 156. The latching and locking means 114 may thereafter be pivoted inwardly as by an inward directed force on a forward surface of latch member 124 as may be provided by a human hand. If the downwardly directed force on trigger 314 is removed, locking member 128 again reassumes its upwardly biased position, as illustrated in FIG. 8B. The rotational movement of latch member 124 about pivot pin 134 takes place about a pivot axis which is laterally offset from the pivot axis of plunger body 126. The pivotal movement of plunger body 126 takes place at the contact surface between rounded end surface 270 and hook body concave surface 116. The spaced apart positioning of the pivot axes of latch member 124 and plunger body 126 cause relative longitudinal sliding movement between the latch member and plunger as the latching and locking means 114 is pivoted rearwardly. The relative sliding movement causes plunger body 126 to be displaced upwardly within latch member 124 causing compression in both lock spring 130 and plunger body spring 132. This compression of both springs causes two independent biasing forces to be generated since plunger body 126 is connected in forced transmitting relationship to the latch member 124 by the bearing relationship of both the springs 130, 132 at the upper transverse wall 242 of the latch member. A torque is produced by the force generated against tip portion 270 of the plunger arm at a point laterally offset from the latch pivot axis 134. In a preferred embodiment, the biasing force exerted by either spring 130 or 132 is sufficient, by itself, to bias the latching and locking means 114 into the closed position illustrated in FIG. 8. As the latching and locking means 114 rotates inwardly from the position illustrated in FIG. 8B, locking member tip portion 304 comes into abutting contact with upwardly rearwardly sloping tip surface 170. In the preferred embodiment, the upper surface 306 of tip portion 304 and surface 170 are substantially parallel. If the inwardly directed force which causes the latching and locking means 114 to pivot inwardly is suddenly released when the latching and locking means 114 is in a substantially spaced apart relation from the hook tip 152, the momentum from the latching and locking means 114 is sufficient to depress locking member 128 as it contacts surface 170 to allow the locking member 128 to pass beneath surface 170 and reassume the locking position illustrated in FIG. 8. It is preferred to construct spring 132 with a sufficient strength and to incline surfaces 170 and 304 at a sufficiently flat angle to cause locking closure with the latch member whenever the inwardly biasing force thereon is released, regardless of the relative displacement of the latching and locking means 114 from the hook tip 152.

Numerous other examples of a latch locking arrangement utilizing interference with the longitudinal movement of a plunger body within a latch member to provide a locking function are illustrated in FIGS. 9 through 24A.

As illustrated in FIG. 9, the latching and locking means 500 may be mounted in a hook body 502, which may have a configuration similar to that of FIGS. 7 or 8 or any number of other hook body configurations, comprising a hook body latch attachment portion 504 and a hook body latch engaging tip portion 506. A pivot pin 513 receiving hole 508 is provided in the hook body latch attachment portion 504 in close but laterally spaced apart relationship as by a distance X from a socket portion 510 adapted to accept a plunger end portion thereon in bearing pivotal relationship therewith. A latch member 522 which may have a configuration identical or similar to that of the latch member illustrated in FIGS. 7 and 8 comprises a latch member pivot end 524 having coaxial pivot holes 525 positioned therein. The latch member comprises a latch engaging end 526 at the end opposite the pivot end 524. The tip engaging end may comprise a closed transverse end wall 528 for receiving an end portion of a spring means or other biasing means thereagainst. In the embodiments illustrated in FIGS. 9 and 9A the latch member tip engaging end 526 comprises parallel wing portions 527 extending in spaced apart parallel relationship beyond transverse wall 528 and engaging an outwardly extending nub portion 512 of hook tip 506 of a forged hook body at forward edge surfaces thereof. In other embodiments as illustrated in FIGS. 10, 10A, 18, 18A, 20 and 20A, the top engaging end of the latch member has an identical structure to that shown in FIGS. 7, 8, and 8A. Similarly, parallel wing portions 248 and 246 in FIGS. 7, 8, 9 and 9A may be provided at the pivot end 524 of the latch member 522 to facilitate pivotal movement of the latch member about the hook body latch attachment portion 504. An elongate plunger body 552 having a rounded pivoted surface 554 at one end thereof, is pivotally received within socket portion 510 of the hook body 502. Due to the fact that the socket portion 510 is laterally spaced apart at a distance X from the pivot axis of the latch member provided by pivot pin 513, rotational movement of the latch member 522 about its pivot axis in the rearward direction as indicated in FIG. 9A causes relative longitudinal displacement of the plunger body 552 within the latch member 522 in a direction towards the latch member tip engaging end 526 as described with reference to FIGS. 7, 8, 8A and 8B.

The structure of FIGS. 9 and 9A identified by 500 series numerals is present in each of the various embodiments illustrated in FIGS. 9 through 24A and are indicated on each of the Figures. Since this structure is essentially identical from Figure to Figure in FIGS. 9 through 24A, it is not further discussed, except in relationship to latch hook operation or to other structure, in the discussion of each of the embodiments of FIGS. 10 through 24A. Similarly, the reference directions explained in the discussion of FIGS. 7, 8, 8A and 8B will be in the discussion of the other embodiments.

As illustrated in FIG. 9, a spring means 602 is received at opposite ends thereof on an upper end surface 614 of plunger body 552 and latch member transverse wall surface 528. A button body 606 having an elongate channel extending from end to end for receiving plunger body 552 therethrough is pivotally attached as by pivot pin 608 to latch member 522. A tongue portion 610, mounted on the button body 606 in a position to be received within the notched portion 612 of plunger body 552, engages a lower surface of the notch portion 612 when latch member 522 is in the latched position illustrated in FIG. 9. The button body 606 comprises a tapered button portion 615 thereon which is received through a button hole 616 in the latch member 522. Button hole 616 limits the outward deflection of the button body 606 by engagement of a lower tapering surface 615 thereof. The button body 606 is biased in the position illustrated in FIG. 9 wherein tongue 610 lockingly engages 552 and button portion 614 is urged against the edge of button hole 616, by a biasing means such as a leaf spring 620 mounted on a wall surface of latch member 522. As illustrated in FIG. 9A, when button 614 is depressed by an outside force, button body 606 is pivoted rearwardly to a position disengaged from notch 612. With the button body 606 thus displaced from locking engagement with plunger 552, the latch member 522 may be pivoted rearwardly by an external pivot force. As explained in discussions of other embodiments, the rearward pivotal movement of the latch member 522 causes further compression of springs 602 increasing the biasing force exerted through the plunger body 552 against socket surface 510 causing relative forward pivotal movement of the latch member 522 when the rearwardly directed opening force is removed.

As illustrated by FIGS. 10 and 10A, the latch member 522 may be provided with an inner shoulder 630 on the forward interior side thereof which engages a right angle corner portion 632 at the upper end of plunger body 552. A compression spring 634 bearing on the upper end surface of plunger body 552 and upper transverse wall 528 of the latch member is compressibly loaded and provides the biasing force on the plunger body 552 which urges the latch member 522 into engaging contact with the hook tip 506. Inward rotation of the latch member 522 is prevented by the abutting engagement of opposed surfaces of shoulder 630 and corner 632. A housing member 636 which is pivotally attached as by a pivot pin 638 to the latch member 522 comprises a rod portion 640 extending inwardly from a forward surface thereof which may be received through a hole 642 in the latch member 522 when the housing member 636 is pivoted inwardly with respect thereto. Inward pivotal movement of housing member 636 causes rod portion 640 to abuttingly engage surface 644 on the plunger body 522 causing the plunger 552 to rotate inwardly in the direction indicated by arrow 646 about rounded tip portion 554 on surface 510 of the hook. The angular displacement of the plunger body 552 thus provided causes disengagement between shoulder 630 and corner 632 allowing relative longitudinal movement of the plunger body 552 within the latch member 522 when an inwardly directed force is applied to the latch member as illustrated in FIG. 10A. Again, compression of the spring 634 produces a biased force tending to resist the opening movement of the latch member 522 which restores it to the orientation of FIG. 10 when the opening force is removed.

It may be seen that the positioning of the spring over the longitudial center of the plunger body 552 produces a spring compression force which is directed along the center line plunger 552. The laterally offset position of point 554 from the plunger center line thus creates a couple tending to rotate the plunger body inwardly toward shoulder portion 630 when the counter torque provided by inward movement of rod 640 against surface 644 is removed. Thus plunger body 632 reseats itself due to the downward and forward urging thereof relative the latch member 522 by the force of spring 634. A leaf spring 648 may be provided between housing 636 and latch member 522 to insure proper repositioning of the latch member after the unlocking force is removed therefrom.

As illustrated in a slightly different configuration in FIGS. 11 and 11A, the plunger 552 may comprise a button portion 660 thereon adapted to be received within a hole 662 in the forward wall surface of latch member 522. The hole 662 may comprise a forward edge surface 664 thereon which abuttingly engages a shoulder portion 666 at the upper end of button 660. The engagement between shoulder 666 and edge surface 664 prevents relative longitudinal sliding movement of plunger 552 within latch member 522 thus preventing inward rotational movement of the latch member as explained above. Leaf springs 668 or coil spring 668A mounted on a rear wall surface of latch member 522 exerts a forwardly directed force against a recessed surface portion 670 on a rearward side of the plunger body which urges the button 660 in a forward direction causing it to seat at edge surface 664. The plunger portion 552 is also urged downwardly and forwardly by the compression of coil spring 672 mounted between an upper end surface of the plunger body and latch transverse wall surface 528. Compression spring 672 also biases the latch member in the latched position, urging the latch member 522 generally forward in response to any rearward pivotal displacement thereof.

As illustrated in another embodiment in FIG. 12, a spring arrangement similar to that illustrated in FIGS. 11 and 11A above is provided by the arrangement of FIG. 12, except that the forward displacement of the plunger 552 is provided by a coil spring 668A rather than a leaf spring 668 and locking engagement is provided at a shoulder portion 680 of the plunger body positioned at all times entirely within the latch member 522 and engaging a corner surface 682 provided within the latch member. A button means 684 which engages the plunger body through a hole 660 therein is entirely separate from the plunger body and is prevented from being positioned entirely within the latch member by a relatively long extending button portion 684 which is never entirely received within the latch member when it is depressed. As illustrated by FIG. 12A, the depression of the button in the direction shown allows relatively longitudinal sliding movement of the plunger body 552 within the latch member 522 allowing pivotal movement thereof. The springs 668A, 672 act in the same manner described above with reference to FIGS. 11 and 11A to produce biasing of the latching member 522 in a latched position and biasing of the plunging member 552 in a locked position. As illustrated in FIG. 12B a housing member 688 may be pivotally attached to latch member 522 and used to urge inward movement of button 684 as by grasping and squeezing of the latch member 522 and housing 688.

As illustrated by FIGS. 13 and 13A, the latching and locking means 500 may comprise a plunger body 552 having a forwardly projecting abuttment portion 700 thereon which may be received within a hole 702 in the latch member 522. The plunger body comprises a shoulder portion 704 thereon positioned at an upper portion of the plunger button 700 which lockingly engages an edge surface 706 of the latch member 522 which is defined by the upper boundary of latch member hole 702. A pair of compression biasing springs 708, 710 are positioned in force transmitting relationship between portions of the latch member 522 and portions of the plunger body 552. In a preferred embodiment, lower spring 708 is received within a lower portion 712 of the plunger body 552 at a position proximate and inwardly spaced from button 700 and is received at an upper end thereof on a rear wall surface of the plunger body 552 at an orientation which urges the plunger body 552 downwardly and forwardly relative the latch member 522. The upper spring 710 is positioned at a terminal upper end surface 716 of the plunger body 552 and is received at the other end thereof at an inner corner portion formed by the plunger body rear sidewall and transverse wall 528. The alignment of the spring 710 with the plunger body 552 is such that it also urges the plunger body downwardly and forwardly relative the latch member 522. As illustrated by FIG. 13A when an inwardly directed force is exerted on button 700 releasing the locking engagement between shoulder portions 704 and edge surface 706, the plunger body 552 is free to move longitudinally relative the latch member 522, thus permitting the latch member to be pivoted inwardly to open the hook. Springs 708, 710 are compressed by the inward pivoting of the latch member 522 about pivot pin 513 increasing the biasing force exerted through the plunger body 552 to the hook body surface at 510 to create a torque resisting the opening movement of the latch member 522. The force exerted by the springs 708, 710 also urge the plunger body 552 forwardly. Thus, when the inwardly directed force on the button 700 is released and when the torque causing the inwardly pivoting movement of the latch member 522 is released, the latch member pivots forwardly to the position illustrated in FIG. 13 and the plunger body 552 moves forwardly and downwardly relative to the latch member until it again seats within hole 702 as illustrated by FIG. 13. In this arrangement both springs 708 and 710 perform the same function. That function being to bias the plunger body 552 into a locked position and also to bias the latch member 522 into a latched position. Thus, both of these biasing operations would continue even if one of the springs 708, 710 were to become unoperational.

As further illustrated by FIG. 13, a tension biasing spring 722 which is shown in phantom, may be used to replace either of the springs 708, 710 or may be used in addition thereto to provide further redundancy to the system by duplicating their function. Spring 722 is attached at an upper end thereof to plunger body 552 as by eyelet portion 724 and is attached to the hook body latch attachment portion 504 as by eyelet portion 726. As illustrated by FIG. 13A, the spring is placed under increased tension by the inward pivotal movement of latch member 522 and tends to urge the latch member and plunger body into the position illustrated in FIG. 13.

As illustrated by FIGS. 14 and 14A, the latching and locking means may comprise a pivotal button member 730 having a pivot end 732 pivotally attached by pin means 513 to body portion 504 to allow relative pivotal movement of the button member 730 within latch member 522. The button member comprises a forwardly projecting button end 734 which is received within a button hole portion 736 of the latch member 522. The pivotal button member 730 also comprises a channel portion 738 extending from a position upward of pivot pin 513 and extending upwardly through the remaining length of the pivotal button member 730. The channel portion 738 slideably accepts plunger body 552 therein. A notched out portion 740 of the plunger body is adapted to accept a tongue portion 742 fixedly mounted in the button body 730 in perpendicular closing relationship with the channel portion 738. A lower surface of the notched portion 740 is engageable with a lower surface of tongue portion 742 to prevent relative longitudinal movement of the plunger body 552 with respect to the latch member 522 when the latching and locking means 500 is in a locked position. The tongue 742 and notch 740 are biased in the locked position by compression spring 744 positioned within a bore portion 746 of button 734 which opens into channel 738. The spring 744 is placed in compressive engagement between a forward end wall surface 748 of the button and a forward side surface 750 of the plunger body 552. An upper portion 752 of the plunger body is received within an annular transversely extending wall portion 754 of the latch member 522 in a manner which allows longitudinal movement of the plunger body 552 but which restrains lateral movement thereof relative the latch member 522. Thus, an inward pivoting movement of the button body 730 caused by inward depression of button 734 causes plunger body upper portion 752 to be restrained by an edge portion of wall 754 and causes tongue portion 742 to be outwardly displaced of notch portion 740 whereby plunger 552 is rendered longitudinally moveable relative latch member 522. A first latch biasing spring 756 is provided between a terminal end of plunger body 552 and latch member end wall 528. A second latch biasing spring 758 is positioned in spaced apart circumscribing relationship with a mid portion 760 of the plunger body and is restrained between a lower shoulder portion 762 of the plunger body and annular wall 754. Thus, inward pivotal movement of latch member 522 about pivot pin 513 causes additional loading of springs 756 and 758 which act through the plunger body against hook body surface 510 to urge the latch member 522 into the latched position illustrated in FIG. 14. The biasing force produced by compression spring 744 similarly biases the button body 730 into the locked position relative the plunger body which is illustrated in FIG. 14.

Figure 15:
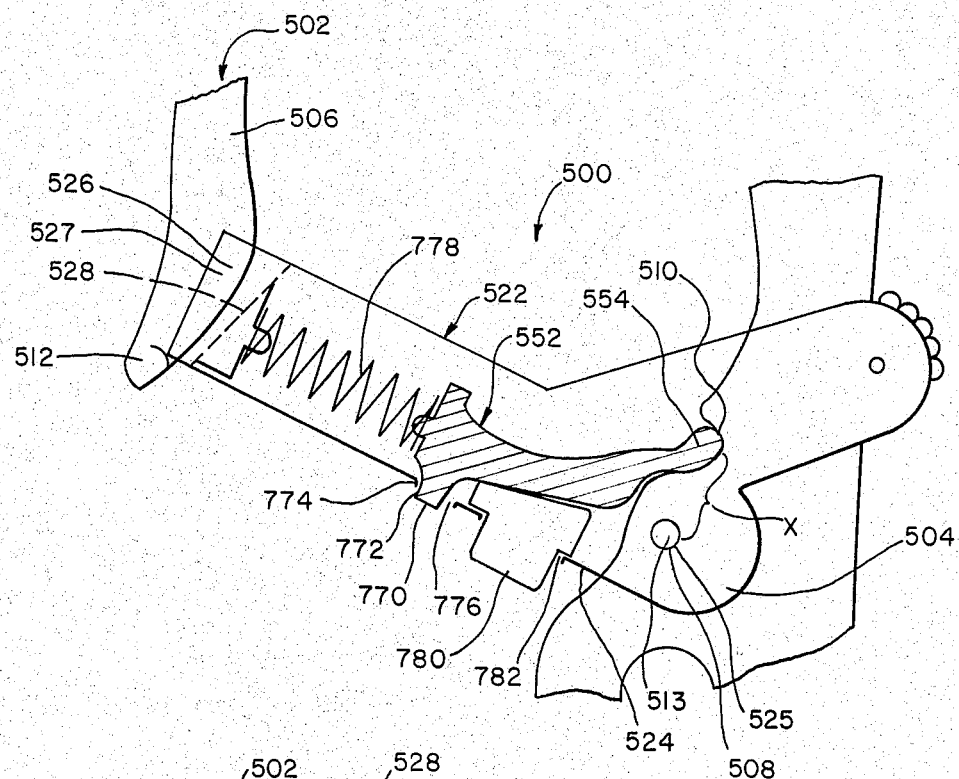
FIG. 15 is a partially broken view of another embodiment of the invention in the latched and locked position.
Figure 15A:
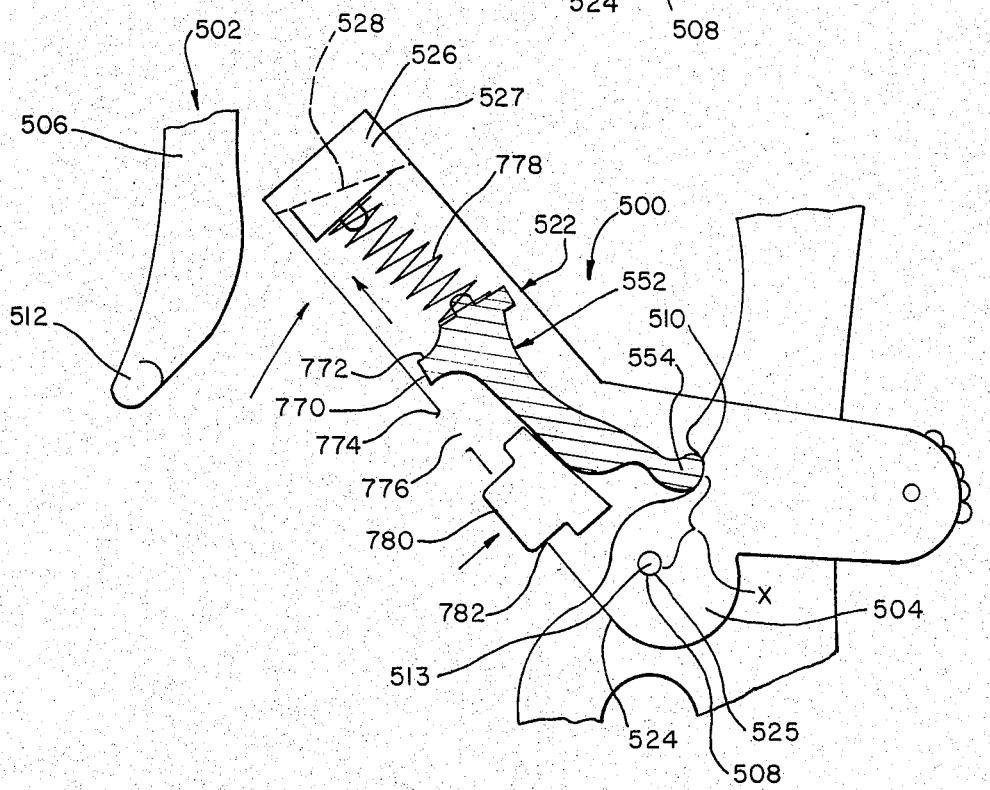
FIG. 15A is a partially broken view of the embodiment of FIG. 15 of the invention in an unlocked, unlatched position.

In an embodiment of the invention illustrated in FIG. 15 and 15A, plunger body 552 comprises a forwardly extending projection 770 having an upper edge surface 772 thereon which, in the locked position illustrated in FIG. 15., engages an edge surface 774 of a first hole 776 provided in latch member 522. The positioning of the hole 776 and the dimensions of the plunger body 552 are such that when the latch member 522 is in the latched position illustrated by FIG. 15, the plunger body 552 may be urged into locking engagement in hole 776. A coil spring 778 is provided between the upper terminal end surface of the plunger body 552 and latch member end wall 528, and urges the plunger body 552 into the aforedescribed locking position due to the fact that the pivot point provided at surface 510 of the hook body is laterally offset from the center line of the force generated by spring 778 creating a couple which tends to rotate the plunger body 552 forwardly within the latch member 522 and thence into the locked position of FIG. 15. A button member 780 extending forwardly through a second hole 782 in a forward surface of the latch member 522 abuttingly engages the plunger body 552 at a lateral surface thereof whereby the plunger body may be urged rearwardly by depression of the button 780. Button 780 extends outwardly from hole 782 a sufficient distance whereby it cannot be fully received within the latch member 522. Inward depression of button 780 thus causes surfaces 774 and 772 to be disengaged from abutting contact allowing relative longitudinal movement of plunger body 552 within latch member 522 thus allowing latch member 522 to be urged inwardly in response to an opening force applied thereto. The inward pivotal movement of latch member 522 causes compression of spring 778 as described in other examples above to increase the biasing force thereof exerted through plunger 552 to urge the latch member into the locked and latched position illustrated in FIG. 15 when the opening force on the latch member is removed.

As illustrated in FIGS. 16 and 16A, plunger body 552 may have a pivot arm 790 pivotally mounted at a mid portion thereof as by pivot pin 792. The pivot arm 790 is of a construction and arrangement whereby it is pivotable into generally parallel abutting relationship with a forward surface of the plunger body 552. A locking spring 794 may be provided in a recess 796 of the plunger body at a position upward of the point of pivotal attachment 792. The locking spring 794 is constrained by opposed surfaces 798 of recess 796 and rearward lateral surface 798 of the pivotable arm 790. Arm 790 comprises a right angle shoulder portion 800 on a forward surface thereof which abuttingly engages an upper edge surface 802 of latch member cutout portion 804. The construction and arrangement of the latch member cutout portion 804, plunger body 552, and pivot arm 790 is such that a rearward portion 806 having a forward surface 808 extends into hole 804 with surface 808 positioned in substantially parallel coplanar relationship with the outer surface 810 of the latch member 522 forward wall. A second coil spring 812 is positioned in compressive engagement between the upper terminal end surface of plunger body 552 and latch member end wall 528. As illustrated by FIG. 16A, a rearwardly directed force applied to surface 808 of pivot arm 790 produces inward movement thereof relative catch body cutout edge surface 802 by compression of spring 798 and/or inward pivotal movement of plunger body 552. Plunger body 552 may be of an arrangement whereby no inward pivotal movement relative the latch member 522 is produced by such a rearwardly directed force on surface 808. The inward pivotal movement of pivot arm 790 causes displacement of shoulder surface 800 relative edge surface 802, thereby allowing relative longitudinal movement of plunger body 552 within latch member 522 when an opening force is applied to the latch member. Spring 812, of course, biases the latch member into the latched position illustrated in FIG. 16 in the same manner as described in numerous examples above. The spring 794 similarly urges pivot arm 790 into the locked position when the rearward force applied to surface 808 is removed.

In the embodiment illustrated in FIGS. 17 and 17A, locking is provided at an upper corner portion 820 of plunger body 552 which abuttingly contacts a right angle shoulder 822 formed at an interior portion of the latch member forward sidewall. A pivot member 824 having an externally extending arm portion 826 and an internally extending arm portion 828 is pivotally mounted on latch member 522 as by pivot pin 830. A cutout portion 832 in the latch member forward wall allows external arm portion 826 to project outwardly from the latch member in acutely angled relationship with the exterior forward surface thereof when the latching and locking means 500 is in the locked position illustrated by FIG. 17. In the locked position, interiorly projecting arm 828 is positioned in contacting relationship with the plunger body 552 at a forward intermediate surface portion 833 thereof. As illustrated by FIG. 17A, the force applied to arm portion 826 in a rearward position causes arm 828 to produce pivotal movement in plunger body 522 about hook body surface 510. Such pivotal movement causes plunger surface 820 to be outwardly displaced from shoulder surface 822 allowing relative longitudinal movement of plunger body 552 within latch member 522. Spring 836 compressibly positioned between the upper terminal end surface of the plunger body 552 and latch member end wall surface 528 biases the latching and locking means 500 in the locked position illustrated in FIG. 17. The inward positioning of the upper end of spring 836 on wall surface 528, in addition to biasing plunger body 552 downwardly relative latch member 522, also biases the upper end of plunger body 552 forwardly into the locked position illustrated in FIG. 17 when the lock opening force on member 826 and the latch member opening force is removed.

As illustrated by FIGS. 18 and 18A, a plunger arrangement which is essentially identical to that of FIGS. 11 and 11A may be provided without a leaf spring 668. In this embodiment, the plunger body 552 is urged forwardly into locking engagement with edge 664 of hole 660 by the action of coil spring 672 alone. Spring 672 urges the plunger body 552 forwardly as well as downwardly relative the latch member 522 due to the fact that the force vector of the spring acts on the latch member in a longitudinally downward direction which is spaced forwardly from the latch member pivot point at surface 510, thus producing a torque tending to rotate the plunger body 552 forwardly within the latch member 522. A housing 688 having an identical structure and operation to that illustrated in FIG. 12B may be mounted on the latch member 522 to facilitate opening thereof.

As illustrated in FIGS. 19 and 19A, a plunger 552 having a plunger button portion 840 which may be extended through a button hole 842 in a forward wall portion of latch member 522 to provide locking engagement of the plunger relative the latch member by abutting engagement of button shoulder 844 and hole edge surface 846 is downwardly biased relative the latch member 522 by a coil spring 848 positioned in compressive engagement between an upper terminal end of the plunger body 552 and end wall surface 528 of the latch member. A second coil spring 850 is positioned in compressive engagement between a recessed surface portion 852 at a mid portion of the plunger body and a recessed surface 854 on the hook body latch attachment portion 504 which is positioned inwardly of plunger receiving surface 510. Spring 850 thus tends to urge the plunger body 552 forwardly and slightly upwardly relative the latch member 522. Button 840 may be depressed by a rearward force thereon to unseat it from locking engagement with edge surface 846 and thereby allowing relative longitudinal movement of the plunger body 552 relative the latch member 522 when a latch opening force is applied to the latch member as illustrated in FIG. 19A. The compressive strength of spring 848 is sufficient to overcome the upward force component of spring 850 when the latching and locking means is in an open position as illustrated in FIG. 19A. After an opening force is removed from the latch member, the plunger is thus urged downwardly and forwardly relative the latch member by the coaction of the two springs 848 and 850. Spring 848 biases the latch member into the closed latched position illustrated by FIG. 19 due to the offset positioning of plunger pivoting surface 554 relative latch member pivot axis 513 as discussed in the above embodiments. The latch member 522 is also urged forwardly into the latched position by the compressive force of spring 850 which is exerted on the latch member through the plunger body 552. Thus, springs 848 and 850 also coact to provide a biasing force on the latch member 522. The biasing force is, of course, increased as the latch is opened due to the greater compression of the springs 848, 850 by the relative displacement of the plunger body relative the latch member and of the relative displacement of the plunger body and latch member relative the hook body.

As illustrated in FIG. 20, an arrangement similar to that discussed with reference to FIGS. 7, 8, 8A and 8B may be employed in which a plunger body 552 is positioned in longitudinal alignment with the latch member 522 on a rear side thereof and a locking member 860 is provided in parallel relationshp with the latch member 522 within a forward portion thereof. A latch member inner wall 862 extending longitudinally downwardly from the end wall 528 and extending generally perpendicularly between the opposed lateral side walls of the latch member 522 divides the latch member into parallel forward and rearward chambers 864, 866 in which the locking member 860 and the plunger body 552 are respectively positioned. A coil spring 868 is positioned in compressive relationship between an upper terminal end of the plunger body 552 and the latch member end wall 528. A cutout portion 870 is provided in end wall 528 above forward chamber 864 for receiving a tip portion 872 of locking member 860 therethrough in close sliding relationship in the same manner as described above with reference to FIGS. 7, 8, 8A and 8B. A latch member lower shelf portion 874 extending outwardly from the latch member forward sidewall terminates within the forward chamber portion 864. The shelf portion 874 supports a lower end of a coil spring 876 in compressive engagement therewith. The upper end of the coil spring 876 is engaged in compressive contact with an upper edge portion 878 of an elongate longitudinal bore 880 in the lower end of the lock member 860. A shoulder portion 882 such as may be formed from a clip or the like, may be provided immediately below the tip portion 870 of the locking member 860. Coil spring 876 thus urges the shoulder portion 882 into abutting contact with a lower surface of latch member terminal wall surface 528. An opening 884 is provided in a lower forward sidewall surface of the latch member 522 allowing a forwardly projecting button portion 886 of the locking member to extend outwardly of the latch member. The opening 884 extends downwardly a sufficient distance to allow a lower surface of the button portion 886 to be urged downwardly against shelf portion 874, as illustrated in FIG. 20A. In the locked position illustrated in FIG. 20, locking member tip portion 872 is positioned in interfering relationship with edge surface 890 of the hook tip 502 in the same manner as described above with reference to the embodiment of FIGS. 7, 8, 8A and 8B. The space between the lower surface of bottom 886 and shelf 874 is sufficient to allow tip 872 to be moved in non-interfering relationship with edge surface 890 when the button 886 is fully depressed. Depression of button 886 thus unlocks the locking and latching means 500, allowing it to be pivoted inwardly by an opening force directed thereagainst. As the latching and locking means 500 pivots inwardly, spring 868 is further compressed and a force exerted through plunger 552 tending to urge the locking and latching means 500 into the latched position illustrated in FIG. 20 is increased. Thus, when the opening force is removed from the latch member, the latch returns to the latched and locked position illustrated in FIG. 20. In a preferred embodiment, the latching force generated by spring 868 is sufficient to depress locking member 860 when the beveled surface thereof encounters the beveled surface of the hook body tip during the forwardly pivoting latching motion of the latching and locking means. Thus, spring 868 exerts a force causing latching and relocking of the latching and locking member and spring 876 exerts a force retaining the locking member 860 in the locked position.

As illustrated in FIG. 21A, a J-shaped locking member 900 having a tip portion 902 positionable in interfering relationship with an edge surface 904 of a hook tip cutout portion 906 is positioned in closely spaced parallel relationship with a latch member 522 forward wall surface. The latch member 522 forward wall comprises a cutout portion 908 therein, through which a lower forwardly curving portion 910 of the J-shaped member projects. A relatively broad plunger member 552 having a forward surface 912 positioned in parallel sliding relationship with a rear surface 914 of the J-shaped locking member and having a rear surface 916 positioned in parallel sliding engagement with the rear wall of the latch member 522 occupies a rear portion of the latch member 522 interior. A first coil spring 918 is positioned in compressive relationship between an upper terminal surface of the plunger body 552 and a lower surface of a forwardly projecting shelf portion 920 of the latch member which extends forwardly from the rear wall thereof and which terminates at a position in near touching relationship with the J-shaped member 900. An upper spring 922 is positioned in compressive relationship between an upper surface of shelf 920 and a lower surface of a J-shaped member upper rearward projection 924. The J-shaped member upper rearward projection 924 is urged by spring 922 into abutting contact with latch member upper shelf portion 926 which terminates in closely spaced lateral relationship with the J-shaped member tip portion 902 at a longitudinal position slightly below the tip 902. Thus, spring 922 urges the J-shaped member upwardly, placing tip portion 902 in interfering relationship with surface 904. Latch body cutout portion 908 extends downwardly a sufficient distance to allow J-shaped member outward projection 910 to be urged downwardly a sufficient distance to place tip portion 902 in non-interfering relationship with edge surface 904, thereby allowing latching and locking means 500 to be urged into an open position by an inwardly, direct force as illustrated in FIG. 21A. When the opening force is released, the compressive force exerted by spring 918 on plunger body 552 causes forward pivotal movement of the latch member 522 into the latching position illustrated in FIG. 21 with the latching force exerted by spring 918 sufficient to cause compression of spring 922 a sufficient distance to allow hook tip 902 to re-enter cutout portion 906.

As illustrated by FIGS. 22 and 22A, another embodiment of the invention may be provided with a J-shaped member of identical construction to that illustrated and described with reference to FIGS. 21 and 21A above. However, in this embodiment, latch member shelf portions 920 and 926 are removed and springs 918 and 922 are replaced by a single coil spring 919 positioned in bearing relationship between the upper terminal surface of plunger body 552 and the lower edge surface of J-shaped member rearward projecting portion 924. Thus, both the latching bias exerted on the plunger body 552 and the locking bias exerted on the J-shaped member 900 are provided by single spring 919. In addition to the locking means provided by J-shaped member 900 in cooperation with spring 919, plunger body 552 and latch member 522, a second locking means may be provided. A latch member inward extension portion 940 having opposed lateral side walls 942 extends in parallel enclosing relationship with a hook body mid portion 944 defining a portion of the hook enclosure. A rotatable lock body 946 is pivotally mounted as by pivot pin 948 near the terminal end of extension 940 in rotatable relationship therewith. A curved hooked portion 950 of the rotatable lock body 946 is lockingly engageable with an outwardly projecting catch portion 952 provided in a cutout portion 954 at a rear surface of the hook body 502. Rotatable lock body 946 may be spring biased as by a torsion spring (not shown) into the locking position illustrated in FIG. 22. The rotatable locking member 946 may be rotated in a counter clockwise direction as illustrated in FIG. 22A to release hook portion 950 from locking engagement with catch portion 952, thereby allowing the latch member 522 to be opened as by a force exerted on extension portion 940. Such external locking means are discussed in detail in co-pending application by Wayne L. Olson and Terrance L. Schmidt, filed on even date herewith entitled A Locking Snap Hook, which is incorporated by reference herein.

As illustrated in FIGS. 23 and 23A, locking engagement may be provided between a shoulder portion 960 provided at a forward surface on a plunger body 552 and a shoulder engagement surface 962 provided as by a shelf portion 964 formed on an internal side of a latch member 522 forward wall. The locking engagement of surfaces 960 and 962 prevent relative longitudinal movement of the plunger body 552 within the latch member 522 to prevent rearward rotation of the latch member 522 as discussed in the examples above. The plunger body 552 is biased into the locking position by a coil spring 966 positioned in compressive engagement between an upper terminal end surface thereof and latch member end wall 528. Plunger body 552 may be pivoted rearwardly about surface 510 by a rearward contact force applied at a recess surface 968 therein by pivot member 970. Pivot member 970 is pivotally attached at a pivot end thereof to hook body 502 and comprises an elongate projection 972 thereon which extends through an opening 974 in a lower portion of the latch member 522 and into contact with the plunger body 552 at recessed surface 968 thereof. It may be seen from FIG. 23A that an inward pivotal movement of pivot body 970 causes plunger body 552 to be disengaged from surface 962 thus allowing relative longitudinal movement thereof relative latch member 522 in response to an opening force applied to the latch member. The positioning of the pivot axis of the plunger body 552 relative the direction of force exerted by spring 966 is such that the plunger body is urged into the locking position illustrated in FIG. 23 and the latch member 522 is urged into the latched position illustrated in FIG. 23 when the opening force on the latch member is removed.

As illustrated in FIG. 24, the plunger body 552 may comprise a configuration extending substantially the full width of the latch member 522 in sliding engagement with the forward and rear wall surfaces thereof. The plunger body is provided with a recess portion 980 therein which defines an upwardly and forwardly projecting catch portion 982 of the plunger body. The catch portion 982 is engageable with a hook portion 984 of pivot member 986 mounted in pivotable relationship with the hook body 502 as by pivot pin 988. The hook portion 984 of pivot member 986 extends through a cutout portion 990 in the latch member 522 to engage the catch portion 982. The positioning of the catch portion 982 is sufficiently inward of the forward wall surface of the latch member 522 so as not to catch on an edge surface of hole 990 when the hook portion 984 is released. As illustrated by FIG. 24A, pivotal member 986 may be pivoted outwardly as by pressure from a finger of a human hand on a lower forward portion thereof. The outward pivotal movement of member 986 releases catch portion 982 allowing relative longitudinal movement of the plunger body 552 relative the latch member 522 when an opening force is applied to the latch member. As described above, the off-set position of plunger body pivot portion 554 relative latch member pivot pin 513 causes the compressive force of a spring 992 mounted between an upper surface of the plunger body and end wall 528 to urge the latch member 522 into the closed position illustrated in FIG. 24 when the opening force on the latch member is removed. Pivotal member 986 may be biased in the position illustrated in FIG. 24 as by a torsion spring or other biasing means (not shown). A pivotal member guard surface 994 may be provided as by a projection from the hook body at a position below member 986 to prevent accidental release thereof by a rope thimble rotating within hook attachment portion 996. In addition to the locking cooperation provided between plunger body 552 and pivotal member 986, a second locking arrangement may be provided by pivotable locking member 946 in the same manner and with the same structure as described above with reference to FIGS. 22 and 22A. Thus it may be seen that the latching and locking means 500 may be locked by either of two external locking members which may be actuated as by a thumb and finger of the same hand in simultaneous or sequential order to provide a double-locking and latching hook.

Figure 25:
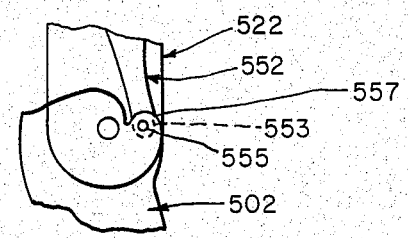
FIG. 25 is a partially broken view showing an alternative pivotal attachment structure of the plunger component which may be used in place of the arrangement shown in FIGS. 7 through 24.

Pivotal engagement between the plunger body 552 and the hook body 502 may be provided in other arrangements such, for example, as illustrated in FIG. 25 in which an end portion 553 of the plunger body is pivotally pinned as by pivot pin 555 to ear portions 557 provided on the hook body 502. Such an arrangement may be substituted for the pivot socket arrangement in each of the embodiments illustrated in FIGS. 7–24A.

It is contemplated that the inventive concepts herein described may be variously otherwise embodied and it is intended that the appended claims be construed to include alternative embodiments of the invention except insofar as limited by the prior art.

What is claimed is:

1. A latching and locking hook comprising:

a hook body having a terminal tip portion and a latch attachment portion thereon, the portion of the hook body extending between said terminal tip portion and said latch attachment portion defining a hook enclosure, said hook enclosure having an enclosure open portion therein terminating at said terminal tip portion and said latch attachment portion of said hook body;

latch means pivotally mounted on said latch attachment portion of said hook body at a lower pivot end thereof for pivotal movement about a latch pivot axis, and engageable with said terminal tip portion of said hook body at an upper free end thereof for selectively opening and closing said hook enclosure, said latch means being selectively positionable between a closed position with said upper free end thereof in engaging contact with said hook body terminal tip portion and at least one open position with said free end thereof in nonengaging spaced apart relationship with said hook body terminal tip portion;

locking means at least partially within said latching means and cooperating with biasing means to selectively interfere with the pivotal movement of said latch means, said locking means being selectively positionable between a locked position in interfering relationship with said latch means when said latch means is in said closed position for preventing movement of said latch means from said closed position to an open position, and an unlocked position in noninterfering relationship with said latch means allowing movement of said latch means from said closed position to said open position;

biasing means having at least a portion thereof received within said latch means for biasing said latch means in said closed position and for biasing said locking means in said locked position when said latch means is in said closed position.

2. The invention of claim 1 wherein said biasing means comprises:

elongate plunger means, received within said latch means in longitudinally displaceable relationship therewithin, having a lower end and an upper end, said lower end of said plunger means comprising a pivot portion pivotally engageable at a plunger pivot axis with a plunger receiving portion of said hook body, said plunger pivot axis being positioned proximate said latch pivot axis and spaced laterally therefrom in a direction toward which said latch means moves in moving between said closed and said open positions; and resilient means operably positioned between said plunger means and an interior surface portion of said latch means for urging said plunger means downwardly relative said latch means whereby said latch means is urged toward said closed position.

3. The invention of claim 2 wherein said plunger pivot axis is positioned within said latch means.

4. The invention of claim 2 wherein said plunger means pivot portion comprises a rounded terminal end portion of said plunger means and wherein said plunger receiving portion of said hook body comprises a recessed socket portion adapted to rotatably engage said rounded terminal end portion of said plunger means therewithin.

5. The invention of claim 2 wherein said plunger means pivot portion comprises a plunger pivot pin receiving portion and wherein said plunger receiving portion of said hook body comprises a plunger pivot pin receiving portion adapted to receive and pinably engage said pin-receiving portion of said plunger means.

6. The invention of claim 2 wherein said plunger means is laterally displaceable within said latch means and wherein said lock means comprises outward extension means operably attached to said plunger means for extending outwardly through a latch lateral opening portion in a lateral sidewall portion of said latch means and for engaging an edge surface of said latch lateral opening portion at an upper surface of said outward extension means when said lock means is in said locked position for preventing longitudinally upward movement of said plunger means relative said latch means and for being received within said latch means in nonengaging relationship with said latch lateral opening portion when said lock means is in said unlocked position.

7. The invention of claim 6 wherein said outward extension means comprises a finger or thumb actuable button.

8. The invention of claim 6 further comprising a housing means pivotally mounted on an exterior portion of said latch means and having a surface portion therein engageable with said extension means whereby inward pivotal movement of said housing means urges said extension means from said edge surface engaging relationship with said latch lateral opening to said nonengaging relationship therewith.

9. The invention of claim 6 wherein said lock means outward extension means is rigidly attached to said plunger body.

10. The invention of claim 6 wherein said lock means outward extension means is pivotally attached to said plunger body and laterally pivotally displaceable relative thereto.

11. The invention of claim 2 wherein said locking means comprises:
   laterally extending engagement means operably attached to said plunger body; and
   an engagement surface provided on said latch means;
   said engagement means being operably engaged with said engagement surface on said latch means for preventing relative longitudinally upward movement of said plunger means relative said latch body when said lock means is in said locked position and being disengaged from said engagement surface in said latch body for allowing relative longitudinal displacement of said plunger means relative said latch body when said lock means is in said unlocked position.

12. The invention of claim 11 wherein said engagement means is rigidly attached to said plunger means.

13. The invention of claim 11 wherein said plunger means is pivotally mounted on said plunger means in laterally pivotally displaceable relationship therewith.

14. The invention of claim 2 wherein said locking means comprises:
   an engagement surface on said plunger means, and
   plunger engaging pivot means for selectively engaging said engagement surface in said plunger means;
   said plunger engaging pivot means being engaged with said engagement surface on said plunger means when said locking means is in said locked position for preventing relative longitudinal displacement of said plunger means relative said latch means;
   said plunger engaging pivot means being disengaged from said engagement surface when said locking means is in said unlocked position for allowing relative longitudinal movement of said plunger means relative said latch means.

15. The invention of claim 14 wherein said plunger engaging pivot means is pivotally attached to said hook body.

16. The invention of claim 14 wherein said plunger engaging pivot means is pivotally attached to said latch body.

17. The invention of claim 2 wherein said locking means comprises:
   an elongate locking member slideably mounted within a longitudinally extending portion of said plunger means, and
   hook tip engagement surface means for engaging a lateral surface portion of said locking member;
   said locking member being selectively positionable into engaging relationship with said hook tip engagement surface when said locking means is in said locked position and in disengaged relationship therefrom when said locking means is in said unlocked position.

* * * * *